(12) United States Patent
Fukuda

(10) Patent No.: US 9,711,021 B2
(45) Date of Patent: Jul. 18, 2017

(54) ARTICLE MANAGEMENT SYSTEM

(71) Applicant: NEC Corporation, Tokyo (JP)

(72) Inventor: Hiroshi Fukuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/034,118

(22) PCT Filed: Oct. 23, 2014

(86) PCT No.: PCT/JP2014/005375
§ 371 (c)(1),
(2) Date: May 3, 2016

(87) PCT Pub. No.: WO2015/068347
PCT Pub. Date: May 14, 2015

(65) Prior Publication Data
US 2016/0292977 A1 Oct. 6, 2016

(30) Foreign Application Priority Data
Nov. 11, 2013 (JP) .................................. 2013-233130

(51) Int. Cl.
*G08B 13/14* (2006.01)
*G08B 13/24* (2006.01)
(Continued)

(52) U.S. Cl.
CPC ..... *G08B 13/2462* (2013.01); *G06K 7/10445* (2013.01); *G08B 13/2417* (2013.01);
(Continued)

(58) Field of Classification Search
CPC .. G06K 7/10366; G06K 7/10128; G01B 7/02; G01V 15/00; G01V 3/12
See application file for complete search history.

(56) References Cited

U.S. PATENT DOCUMENTS 7,271,724 B2 9/2007 Goyal et al.
2004/0203478 A1* 10/2004 Scott ..................... G06K 7/0008
455/70
(Continued)

FOREIGN PATENT DOCUMENTS

EP 2408061 1/2012
JP 09-205306 8/1997
(Continued)

OTHER PUBLICATIONS

International Search Report corresponding to PCT/JP2014/005375, 1 page, mail date Jan. 6, 2015.
(Continued)

*Primary Examiner* — Erin File
(74) *Attorney, Agent, or Firm* — Wilmer Cutler Pickering Hale and Dorr LLP

(57) ABSTRACT

In conventional article management systems, a problem has been presented in that the degree of control over how articles are managed has not been adequate. An article management system having: a line constituted by an open-type transfer line; a distribution area in which articles to be managed are placed, the articles to be managed being placed in the distribution area; an RF tag provided with a tag transmission unit for electromagnetic coupling with the line of the distribution area for the articles to be managed; a signal communication unit provided to the line; an antenna for electromagnetic coupling with the signal communication unit; and an RFID reader for sending out the transmission signal to the line via the antenna, and receiving a response signal output by the tag transmission unit via the line. Any variations in the operating characteristics of the tag transmission unit caused by the articles to be managed are detected as a result of variations in the intensity or phase of
(Continued)

the signal reflected from the RF tag, whereby the presence of an article to be managed is detected.

16 Claims, 24 Drawing Sheets

(51) Int. Cl.
| | | |
|---|---|---|
| *G06K 7/10* | (2006.01) | |
| *H01Q 9/27* | (2006.01) | |
| *H01Q 1/22* | (2006.01) | |
| *H01Q 13/20* | (2006.01) | |
| *H01Q 21/00* | (2006.01) | |
| *H01Q 21/06* | (2006.01) | |
| *H01Q 1/48* | (2006.01) | |
| *H01P 5/02* | (2006.01) | |

(52) U.S. Cl.
CPC ....... *G08B 13/2431* (2013.01); *H01Q 1/2216* (2013.01); *H01Q 1/48* (2013.01); *H01Q 9/27* (2013.01); *H01Q 13/206* (2013.01); *H01Q 21/0037* (2013.01); *H01Q 21/0075* (2013.01); *H01Q 21/061* (2013.01); *H01P 5/028* (2013.01)

(56) References Cited

U.S. PATENT DOCUMENTS

| | | | | |
|---|---|---|---|---|
| 2005/0099222 | A1* | 5/2005 | Yang | H03C 3/40 327/404 |
| 2005/0150102 | A1* | 7/2005 | Bosco | G06K 7/0095 29/593 |
| 2006/0086809 | A1* | 4/2006 | Shanks | G06K 7/10178 235/492 |
| 2006/0093117 | A1* | 5/2006 | Agrawal | H04M 3/42357 379/211.01 |
| 2006/0197676 | A1* | 9/2006 | Smith | H04N 5/4403 340/10.1 |
| 2007/0024447 | A1* | 2/2007 | Burnside | G06K 7/10316 340/572.1 |
| 2007/0222604 | A1* | 9/2007 | Phipps | G06K 7/0008 340/572.7 |
| 2007/0222606 | A1* | 9/2007 | Phipps | G06K 7/0008 340/572.7 |
| 2007/0222609 | A1* | 9/2007 | Duron | G06K 7/0008 340/572.7 |
| 2008/0055088 | A1* | 3/2008 | Fabre | B65G 1/1371 340/572.1 |
| 2008/0129453 | A1* | 6/2008 | Shanks | G06K 7/0008 340/10.1 |
| 2009/0009337 | A1* | 1/2009 | Rofougaran | G06K 7/10237 340/572.7 |
| 2009/0085746 | A1* | 4/2009 | Erickson | G06K 7/0008 340/572.1 |
| 2009/0117847 | A1* | 5/2009 | Roesner | G06K 7/0008 455/7 |
| 2009/0121839 | A1* | 5/2009 | Cornwell | G06K 7/10009 340/10.1 |
| 2009/0231097 | A1* | 9/2009 | Brand | F16D 66/00 340/10.1 |
| 2011/0232849 | A1* | 9/2011 | Bahou | G06Q 10/08 160/2 |
| 2012/0001730 | A1* | 1/2012 | Potyrailo | G06K 19/0717 340/10.1 |
| 2012/0012655 | A1 | 1/2012 | Kai et al. | |
| 2014/0267728 | A1* | 9/2014 | Dahlin | H04N 7/188 348/148 |
| 2015/0161872 | A1* | 6/2015 | Beaulieu | B66C 13/40 340/686.6 |
| 2015/0304611 | A1* | 10/2015 | Nakase | G06K 7/10415 348/143 |
| 2016/0056542 | A1* | 2/2016 | Faraone | H01Q 21/064 343/769 |
| 2016/0125211 | A1* | 5/2016 | Hattori | G06Q 10/06 340/10.1 |

FOREIGN PATENT DOCUMENTS

| | | |
|---|---|---|
| JP | 2006-197202 A | 7/2006 |
| JP | 2009-239404 A | 10/2009 |
| JP | 2010-207376 A | 9/2010 |
| JP | 2010-225127 A | 10/2010 |
| JP | 2010-541388 A | 12/2010 |
| JP | 2011-114633 A | 6/2011 |
| JP | 2012-023515 A | 2/2012 |
| JP | 2012-117905 A | 6/2012 |
| JP | 2012-213216 A | 11/2012 |

OTHER PUBLICATIONS

Written Opinion of the ISA PCT/ISA/237 (includes Partial English translation), mail date Jan. 6, 2015, 5 pages.

* cited by examiner

Fig. 10
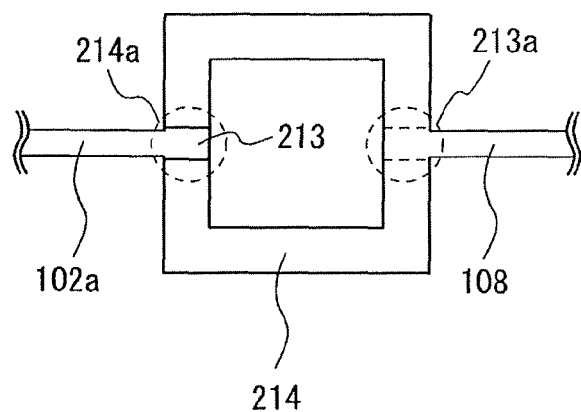
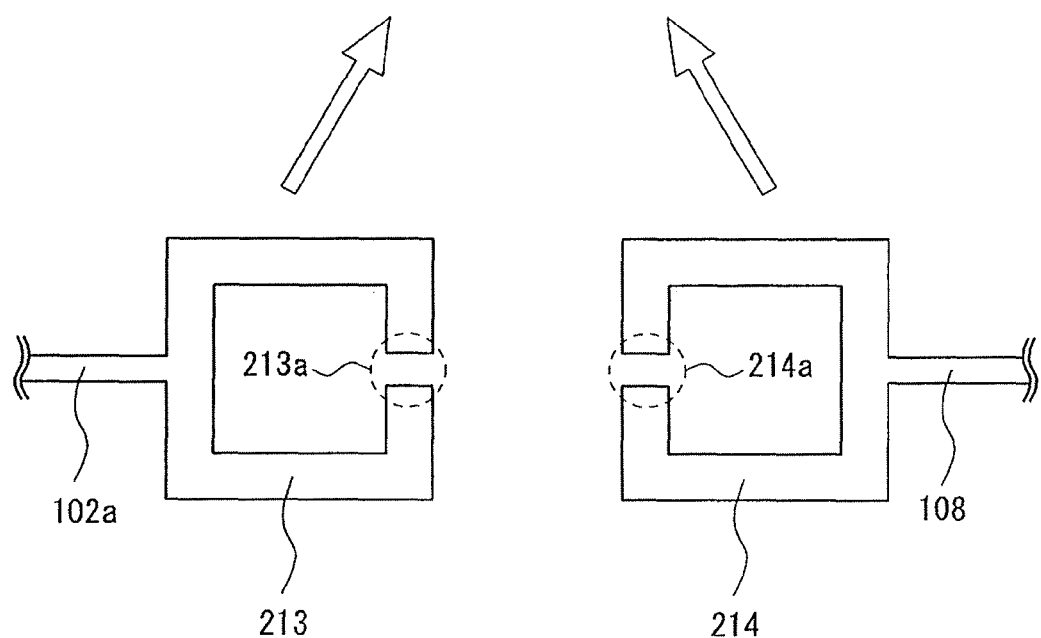

Fig. 12

| DISTANCE $\gamma$ | $1/4 \cdot (\lambda/2\pi)$ $\fallingdotseq 0.04\lambda$ | $1/2 \cdot (\lambda/2\pi)$ $\fallingdotseq 0.08\lambda$ | $\lambda/2\pi$ $\fallingdotseq 0.16\lambda$ | $2 \cdot (\lambda/2\pi)$ $\fallingdotseq 0.32\lambda$ | $\lambda$ | $2\lambda$ |
|---|---|---|---|---|---|---|
| FOR 950 MHz | 1.3cm | 2.5cm | 5.0cm | 10.1cm | 31.6cm | 63.2cm |
| QUASI-STATIC ELECTRIC FIELD $(1/\gamma^3)$ | 64 | 8 | 1 | $1/8 \fallingdotseq 0.13$ | $\fallingdotseq 0.004$ | $\fallingdotseq 5 \times 10^{-4}$ |
| INDUCED ELECTRIC FIELD $(1/\gamma^2)$ | 16 | 4 | 1 | $1/4 \fallingdotseq 0.25$ | $\fallingdotseq 0.025$ | $\fallingdotseq 6 \times 10^{-3}$ |
| RADIATED ELECTRIC FIELD $(1/\gamma^2)$ | 4 | 2 | 1 | $1/2 \fallingdotseq 0.5$ | $\fallingdotseq 0.16$ | $\fallingdotseq 0.08$ |

ARTICLE MANAGEMENT SYSTEM

CROSS-REFERENCE TO RELATED APPLICATIONS

This application is a national stage application of International Application No. PCT/JP2014/005375 entitled "ARTICLE MANAGEMENT SYSTEM," filed on Oct. 23, 2014, which claims the benefit of the priority of Japanese Patent Application No. 2013-233130 filed on Nov. 11, 2013, the disclosures of each of which are hereby incorporated by reference in their entirety.

TECHNICAL FIELD

The present invention relates to an article management system.

BACKGROUND ART

An RFID (Radio Frequency IDentification) system that is becoming popular in recent years is employed for article management, such as inventory management, which uses RF tags attached to articles to be managed.
PTLs 1 to 4 disclose examples of such an RFID system. With the techniques disclosed in PTLs 1 to 3, RF tags are attached to articles to be managed. The articles to be managed are managed by determining that an article to be managed is present if the tag information of an RF tag is readable and that no article to be managed is present if the tag information is unreadable. Unfortunately, the practical application of such an RFID system poses the following problems.

The first problem is unauthorized reading of the tag information of RF tags. When, for example, the RFID system is used to manage commodities lined up on the shelves of retail stores, a third party different from consumers who will purchase the commodities or salesclerks who are engaged in commodity management can also read the tag information of RF tags attached to the commodities. In such a case, for example, a consumer who will purchase or has purchased a commodity can be associated with the information of the commodity, leading to violation of his or her privacy. When the RFID system is similarly used to manage products to be shipped or raw materials stored in warehouses, information security concerns are encountered as well. That is, a third party can know whether raw materials or products equipped with RF tags have been warehoused/shipped, by reading the tag information of the RF tags.

The second problem is the high cost of RF tags. Nowadays, the cost per tag in the UHF (Ultra High Frequency) band has lowered to about less than ¥10, which is still higher by about two orders of magnitude than, for example, the cost of barcodes similarly used for article management, especially commodity management. Therefore, in terms of cost performance, it is difficult to attach RF tags to articles that cost approximately ¥1,000 or less.

PTL 5 discloses a technique for tackling such problems. PTL 5 relates to a technique for managing articles, like the method for using the above-mentioned RFID system. More particularly, PTL 5 relates to a smart shelf that uses an RFID system and to a technique for monitoring the presence or absence of articles on the shelf.

In PTL 5, RF tags are placed on the shelf. Articles serving as objects for management (to be referred to as articles to be managed hereinafter) are positioned to prevent an RFID reader from reading a plurality of RF tags placed on the shelf. In other words, in PTL 5, articles to be managed are placed between the RF tags and an antenna that accompanies the RFID reader. In PTL 5, the quantity of articles is monitored in accordance with the following procedure.

(a) The RFID reader illuminates the shelf with electromagnetic radiation.
(b) The number of RF tags whose tag information cannot be read by the RFID reader because of the presence of the articles is measured.
(c) The quantity of articles is measured based on the information obtained in (b).

Note that the RF tags are tuned so that the articles prevent the reader from reading the tags when the articles are placed between the reader and the tags.

With the above-mentioned technique disclosed in PTL 5, when articles to be managed are placed between the RFID reader and the RF tags, that is, when articles to be managed are located on the shelf, the articles interrupt the line-of-sight vision of the RF tags and the RFID reader to prevent the RFID reader from reading the tag information of the RF tags. In other words, when articles to be managed are present, the tag information of RF tags corresponding to these articles is unreadable so that the presence of the articles to be managed can be detected. When no articles to be managed are located on the shelf, that is, when no articles to be managed are placed between the RFID reader and the RF tags, no articles to be managed interrupt the line-of-sight vision of the RF tags and the RFID reader so that the RFID reader can read the tag information of the RF tags. This means that when articles to be managed are absent, the tag information corresponding to these articles is readable so that the absence of the articles can be detected. It is, therefore, possible in PTL 5 to detect the presence or absence of articles and, in turn, to manage the articles on the shelf. The manageable articles are assumed to contain a metal, water, or other materials that interfere with the transmission of radio frequency energy.

With the above-mentioned technique according to PTL 5, since RF tags are not attached to the articles to be managed but remain on the shelf, neither violation of privacy nor information security concerns result from unauthorized reading of the tag information of the RF tags attached to the articles to be managed. With the technique according to PTL 5, the first problem, that is, unauthorized reading of the tag information of the RF tags by a third party does not occur. In addition, with the technique according to PTL 5, since RF tags are not attached to the articles but remain on the shelf, the RF tags can be repeatedly used and therefore involve a cost per article almost equal to the value of the tag divided by the number of times the tag is used. In other words, the technique according to PTL 5 can solve the second problem, that is, the high cost of the RF tags by sufficient repetitions of use.

PTLs 6 to 9 disclose techniques for non-contact signal communication that uses electromagnetic coupling. With these techniques, a coupler has its one end connected to its other end through electromagnetic capacitive or inductive coupling so that signals can be communicated even if the two ends of the coupler are physically separate from each other.

CITATION LIST

Patent Literature

[PTL 1] Japanese Unexamined Patent Application Publication No. 2011-114633

[PTL 2] Japanese Unexamined Patent Application Publication No. 2012-117905
[PTL 3] Japanese Unexamined Patent Application Publication No. 2006-197202
[PTL 4] Japanese Unexamined Patent Application Publication No. 2012-213216
[PTL 5] U.S. Pat. No. 7,271,724
[PTL 6] Japanese Translation of PCT International Application Publication No. 2010-541388
[PTL 7] Japanese Unexamined Patent Application Publication No. 2010-225127
[PTL 8] Japanese Unexamined Patent Application Publication No. 2009-239404
[PTL 9] Japanese Unexamined Patent Application Publication No. H09-205306

SUMMARY OF INVENTION

Technical Problem

In the above-mentioned technique disclosed in PTL 5, articles to be managed are placed between the RFID reader and the RF tags. In other words, the technique disclosed in PTL 5 imposes a limitation in terms of article placement. That is, the placement of articles to be managed is limited to the positions between the RFID reader and the RF tags. In addition, in the technique disclosed in PTL 5, the RFID reader and the shelf that holds the RF tags must be spaced apart from each other to keep the coverage area of the RFID reader large to manage a plurality of articles. This means that a reader antenna forming part of the RFID reader is also spaced apart from the shelf. This is because a reader antenna that accompanies a commonly-used RFID reader is designed to operate as a source of uniform radio waves in the far-field. Therefore, system deployment that uses the technique disclosed in PTL 5 assumes the requirement of a wide space to propagate radio waves upon communication between the RFID reader and the RF tag.

In other words, in the technique disclosed in PTL 5, the shelf, the articles to be managed, and the RF tags are sufficiently spaced apart from the reader antenna that accompanies the RFID reader so that the reader antenna that is sufficiently smaller than the shelf emits radio waves.

In such a case, depending on the material of the shelf, especially in the use of a metal shelf, multipath phenomena occur so interference of radio waves results in instable reading of the tags or hampers reading of the tag information of the RF tags. Assume herein that a person or an object enters the space between the reader antenna and the position where any article to be managed is placed. Then, as in the case where an article to be managed is present, the tag information of the RF tag is unreadable, so the presence of an article to be managed is erroneously detected even in the absence of an article to be managed.

It is an object of the present invention to provide an article management system that solves such problems.

Solution to Problem

An article management system according to an aspect of the present invention includes: a line constituted by an open-type transfer line terminated with matching termination, the line transmitting and receiving a radio signal; a distribution area in which an article to be managed is placed, the article to be managed being placed in the distribution area; an RF tag provided with tag transmission means for electromagnetic coupling with the line of the distribution area for the article to be managed; signal communication means provided to one end of the line; an antenna configured to perform non-contact signal communication with the signal communication means; and an RFID reader for sending out a transmission signal to the antenna, and receiving a response signal output by the tag transmission means via the antenna, wherein the RFID reader detects one of presence and absence of the article to be managed by detecting a variation in an operating characteristic of the tag transmission means caused by the article to be managed as a result of a variation in one of an intensity and a phase of a signal reflected from the RF tag.

Advantageous Effect of Invention

The present invention can provide an article management system capable of preventing erroneous detection of the presence or absence of articles to be managed while improving security for the articles to be managed.

BRIEF DESCRIPTION OF DRAWINGS

FIG. 10 is a top view illustrating a signal communication unit 213 and an antenna 214 that constitute an open ring coupler.

FIG. 12 is a table representing the dependences of the relative strengths of quasi-static, induced, and radiated electric fields in the electric field $E_\theta$ on the distance $\gamma$ normalized by the wavelength $\lambda$.

DESCRIPTION OF EMBODIMENTS

Figure 1:
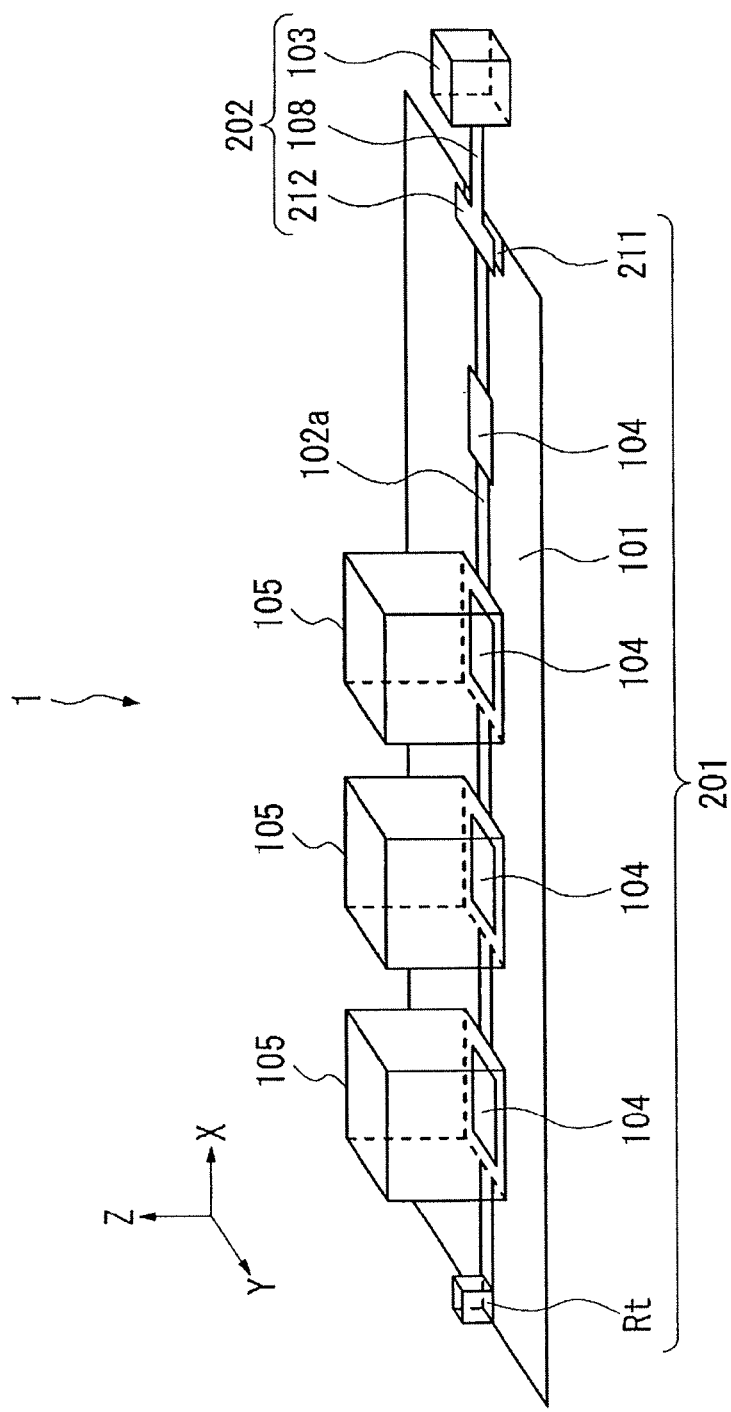
FIG. 1 is a schematic view illustrating an article management system according to a first exemplary embodiment.

Exemplary embodiments of the present invention will be described below with reference to the drawings. In each drawing, the same reference numerals denote the same components, and a repetitive description thereof will not be given where necessary.

First Exemplary Embodiment

An exemplary embodiment of the present invention will be described below with reference to the drawings. First, FIG. 1 is a schematic view illustrating an article management system according to a first exemplary embodiment. An article management system 1 according to the first exemplary embodiment includes a sheet unit 201 and a reader unit 202, as illustrated in FIG. 1. The sheet unit 201 includes an article management plate 101, a line 102a, RF tags 104, a signal communication unit 211, and a matching terminating resistor Rt. The reader unit 202 includes an RFID reader 103 and an antenna 212.

Examples of the article management plate 101 include a plate made of a dielectric substance. The line 102a is formed on the surface where articles to be managed for the article management plate 101 are placed (this surface will be referred to as the front surface hereinafter). The line 102a is constituted by an open-type transfer line terminated with matching termination and transmits and receives radio signals to and from the RF tags 104. The line 102a serves as a microstrip line constituted by an open-type transfer line and can trap electromagnetic waves in a traveling-wave type near-field for the reader. The line 102a is made of a strip conductor. The line 102a has its one end connected to the signal communication unit 211 and its other end connected to the matching terminating resistor Rt. The line 102a can be formed using, as an open-type transfer line, a line that generates an electromagnetic field distribution mainly including quasi-static and induced electromagnetic fields around the transfer line, such as a coplanar line, a slot line, or a balanced two-wire transfer line. Since a coaxial cable or a waveguide that shields the periphery of the transfer line serves as a shielding transfer line that generates no such electromagnetic field around the transfer line, neither of them is available as the line 102a.

The RFID reader 103 sends a transmission signal to the RF tags 104. More specifically, the RFID reader 103 is connected to the antenna 212 and sends a transmission signal to the antenna 212.

The antenna 212 is placed not in contact with, but in proximity to the signal communication unit 211 placed at one end of the line 102a and can be connected to the signal communication unit 211 through electromagnetic inductive or capacitive coupling. With this arrangement, a transmission signal sent from the antenna 212 is passed to the line 102a via the signal communication unit 211. The transmission signal is further passed to the RF tags 104 electromagnetically coupled to the line 102a.

The RFID reader 103 receives response signals from the RF tags 104. Response signals generated by the RF tags 104 electromagnetically coupled to the line 102a are passed to the line 102a. The response signals are further passed to the antenna 212 through electromagnetic inductive or capacitive coupling between the signal communication unit 211 and the antenna 212 and received by the RFID reader 103.

The RF tags 104 are placed at the positions, where they are visible from the line 102a with articles to be managed 105 being located in their vicinities and are electromagnetically coupled to the line 102a. Although the use of passive tags as the RF tags 104 will be exemplified in the present exemplary embodiment, active tags are also available as the RF tags 104. When a passive tag receives a signal for inquiring of the line 102a about an ID (to be referred to as tag information hereinafter), it generates power for activating its chip, using a power supply circuit (not illustrated) in the chip by part of a signal obtained via a tag transmission unit. The passive tag decodes part of the received signal to generate received data.

The passive tag collates tag information stored in a storage circuit within the chip and the received data with each other. When the tag information and the received data coincide with each other, the passive tag operates a modulation circuit (not illustrated) to generate a modulated signal and transmits the modulated signal to the line 102a via the tag transmission unit.

The articles to be managed 105 are placed at positions where they are electromagnetically coupled to the tag transmission units of the RF tags 104. The positions where the articles to be managed 105 are placed will be referred to as a distribution area in which articles to be managed are placed 110 hereinafter. The articles to be managed 105 desirably contain a metal or a high-permittivity material such as moisture but are not limited to such materials. More specifically, examples of the articles to be managed may include drinks in plastic bottles, canned beverages, snack foods packed in aluminum foil packages, bundles of thick paper sheets such as books, rice balls, bread, prepared foods packed in plastic packages, human body parts such as hands and feet, and shoes. A variety of articles including such water-rich articles are dealt with because of the use of an RFID system in the UHF or microwave band. In an RFID system used in frequency bands of 13.56 MHz or less, first, the response to moisture is very poor due to its large skin depth. Further, in these frequency bands, electromagnetic induction is used in coupling between the reader and the tags.

Electromagnetic induction allows coupling using a magnetic field and is therefore insensitive to a difference in relative dielectric constant, although sensitive to a difference in relative permeability. Hence, although water has a very high relative dielectric constant of 80, the operation of the tag transmission unit shows no sensitive reaction to moisture in electromagnetic induction. Most substances generally have relative permeabilities around 1 unless they are magnetic materials. On the other hand, such substances often have relative dielectric constants greatly different from 1. Furthermore, since, unlike an RFID system which depends only on electromagnetic induction, the present invention uses components of quasi-static, induced, and radiated electromagnetic fields, the degree of freedom of relative position between the tags and the line is high. For example, it becomes unnecessary or less necessary to align magnetic fluxes generated by the line to extend through a coil-shaped antenna of the tags, as in an RFID system that uses electromagnetic induction. Because of the high frequency band used, the data rate is also higher in the present invention than in an RFID system that uses electromagnetic induction. It is, therefore, desired to use an RFID system in the UHF or microwave band. The RF tags 104 are covered with plastic plates or the like, but nonetheless a very small amount of moisture, such as drops of dew, may have adhered to the surfaces of the RF tags 104. In such a case, however, the influence of the very small amount of moisture can be eliminated by adjusting, for example, the coupling coefficient between the tag transmission units and the articles to be managed.

The operation of the article management system 1 according to the first exemplary embodiment will be described herein. The article management system 1 detects the presence or absence of articles to be managed based on the tag information of the RF tags 104. In this detection operation, the article management system 1 first sends a tag information readout command from the RFID reader 103 via the line 102a as a transmission signal.

The RF tag 104 then receives the transmission signal via the line 102a. The RF tag 104 generates power using part of the received signal and starts its operation. The RF tag 104 decodes the received signal to reproduce received data included in the received signal. The RF tag 104 refers to the received data and tag information included in the internal storage circuit. If the tag information and the received data coincide with each other, the RF tag 104 sends a modulated signal to the line 102a as a response signal.

At this time, the RFID reader 103 determines the presence or absence of an article to be managed, in accordance with the presence or absence of a response signal from the RF tag 104 corresponding to the sent tag information readout command. More specifically, the RFID reader 103 determines that no article to be managed is present if the intensity of a response signal from the RF tag 104 is high and that an article to be managed is present if the intensity of a response signal from the RF tag 104 is low. For example, in the example illustrated in FIG. 1, since no article to be managed is located on the rightmost RF tag 104 in FIG. 1, this RF tag 104 can send an intense response signal so that the RFID reader 103 determines that no article to be managed 105 is located at the position of this RF tag 104. On the other hand, since articles to be managed 105 are located on the remaining three RF tags 104 in FIG. 1, these RF tags 104 send weak response signals. Therefore, the RFID reader 103 determines that articles to be managed 105 are located at the positions of the remaining three RF tags 104. The RFID reader 103 is connected to a computer or functions as part of a computer, and the computer determines the presence or absence of the articles to be managed 105.

The intensities of response signals vary in the aforementioned manner because the articles to be managed 105 and the tag transmission units of the RF tags 104 are electromagnetically coupled to each other. The positional relationships among the article to be managed 105, the RF tag 104, and the line 102a will be described in more detail below.

Figure 2:
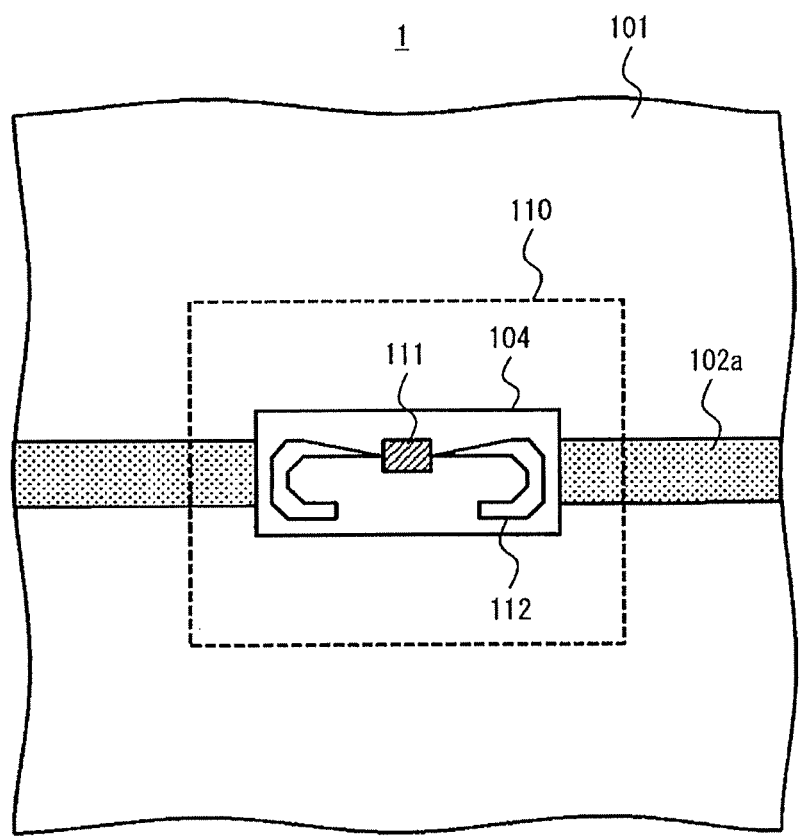
FIG. 2 is a top view of an article management system 1 according to the first exemplary embodiment.

First, FIG. 2 is a top view of the article management system 1 according to the first exemplary embodiment. FIG. 2 illustrates, as a top view, an enlarged view of an area in which one article to be managed 105 is placed. In the article management system 1, the line 102a is formed on the article management plate 101, as illustrated in FIG. 2. The RF tag 104 is placed above the line 102a. A distribution area in which articles to be managed are placed 110 to place the articles to be managed is set at a position which is above the RF tag 104 and at which the RF tag 104 is covered with the article to be managed. The RF tag 104 includes an RFID chip 111 and a tag transmission unit 112.

Figure 3:
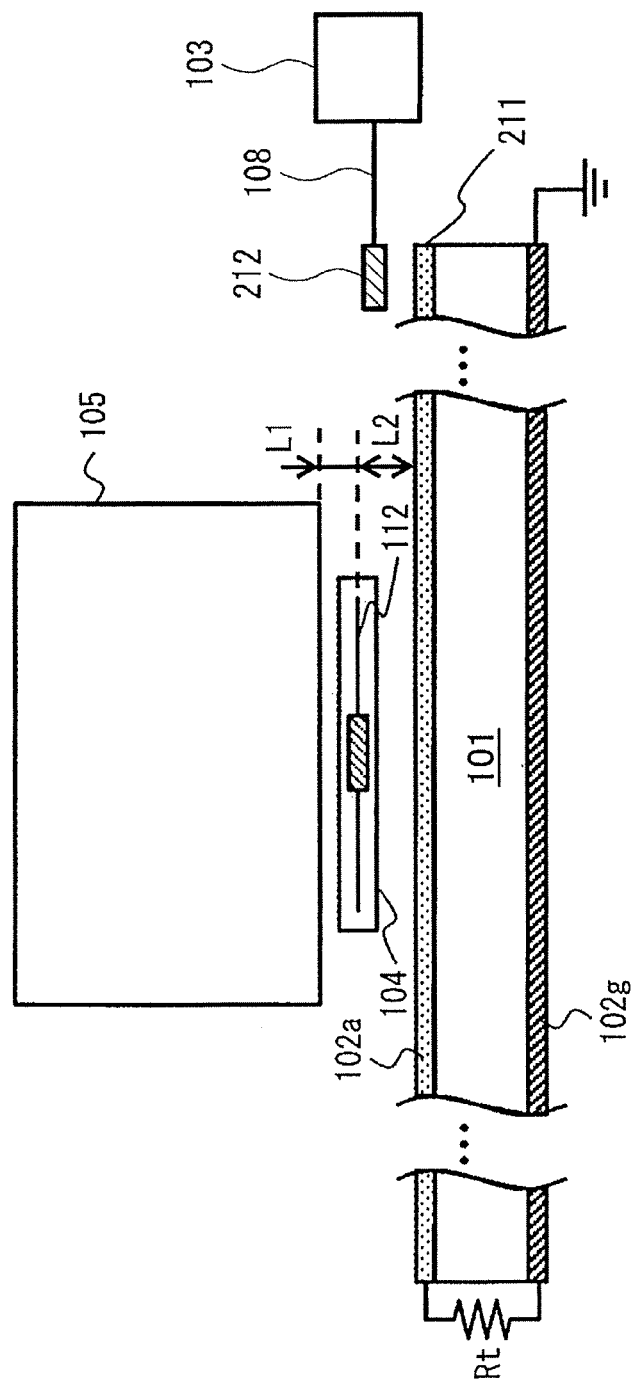
FIG. 3 is a front view of the article management system 1 according to the first exemplary embodiment.

Next, FIG. 3 is a front view of the article management system 1 according to the first exemplary embodiment. FIG. 3 illustrates an enlarged view of an area in which one article to be managed 105 is placed, like FIG. 2. In the article management system 1, the line 102a is placed on the front surface side of the article management plate 101 and a grounding conductor 102g is placed on the back surface of the article management plate 101, as illustrated in FIG. 3. One end of the line 102a is connected to the grounding conductor 102g via the matching terminating resistor Rt. The RFID reader 103 is connected to the other end of the line 102a. Such connection allows matching termination of the line 102a.

The article to be managed 105 is placed at a position having a first distance L1 as the distance between the article to be managed 105 and the tag transmission unit 112 of the RF tag 104, again as illustrated in FIG. 3. The tag transmission unit 112 of the RF tag 104 is placed at a position having a second distance L2 as the distance between the tag transmission unit 112 and the line 102a. The first distance L1 and the second distance L2 are set to satisfy a relation L1<L2. FIG. 3 shows only the relationship of distance among the article to be managed 105, the tag transmission unit 112, and the line 102a. However, to satisfy the above-mentioned relationship of distance, when the RF tag 104 is covered with a plastic plate or the like, the thickness of the plastic plate can be used. In other words, the above-mentioned relationship between the first distance L1 and the second distance L2 can be ensured by embedding the RF tag 104 within a plastic plate, which forms a sheet equipped with the RF tag 104. A technique for forming a sheet using a plastic plate is merely one mode to ensure a given relationship between the first distance L1 and the second distance L2, and other techniques are also applicable.

Figure 4:
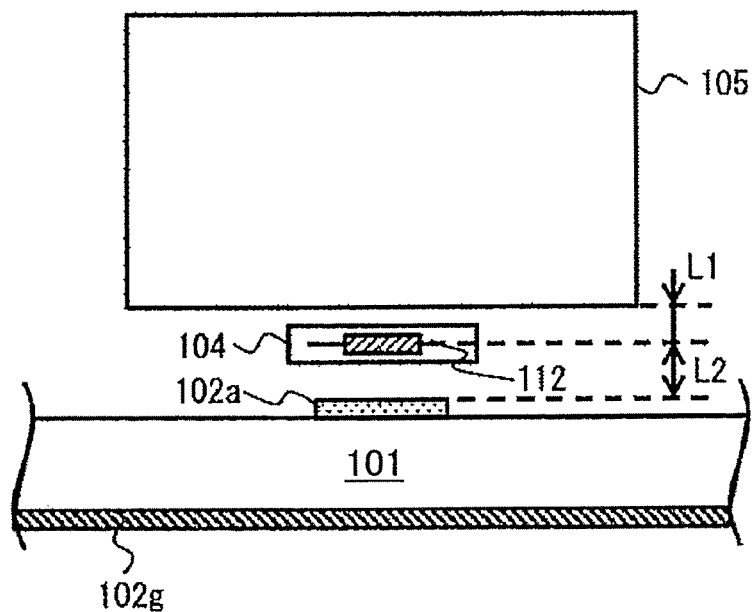
FIG. 4 is a side view of the article management system 1 according to the first exemplary embodiment.

Next, FIG. 4 is a side view of the article management system 1 according to the first exemplary embodiment. FIG. 4 illustrates an enlarged view of an area in which one article to be managed 105 is placed, like FIG. 2. In the first exemplary embodiment, the line 102a is placed in part of a region below the RF tag 104, as illustrated in FIG. 4. In the article management system 1, when viewed from the side as well, the RF tag 104 and the article to be managed 105 are placed such that the first distance L1 and the second distance L2 satisfy a relation L1<L2.

Figure 5:
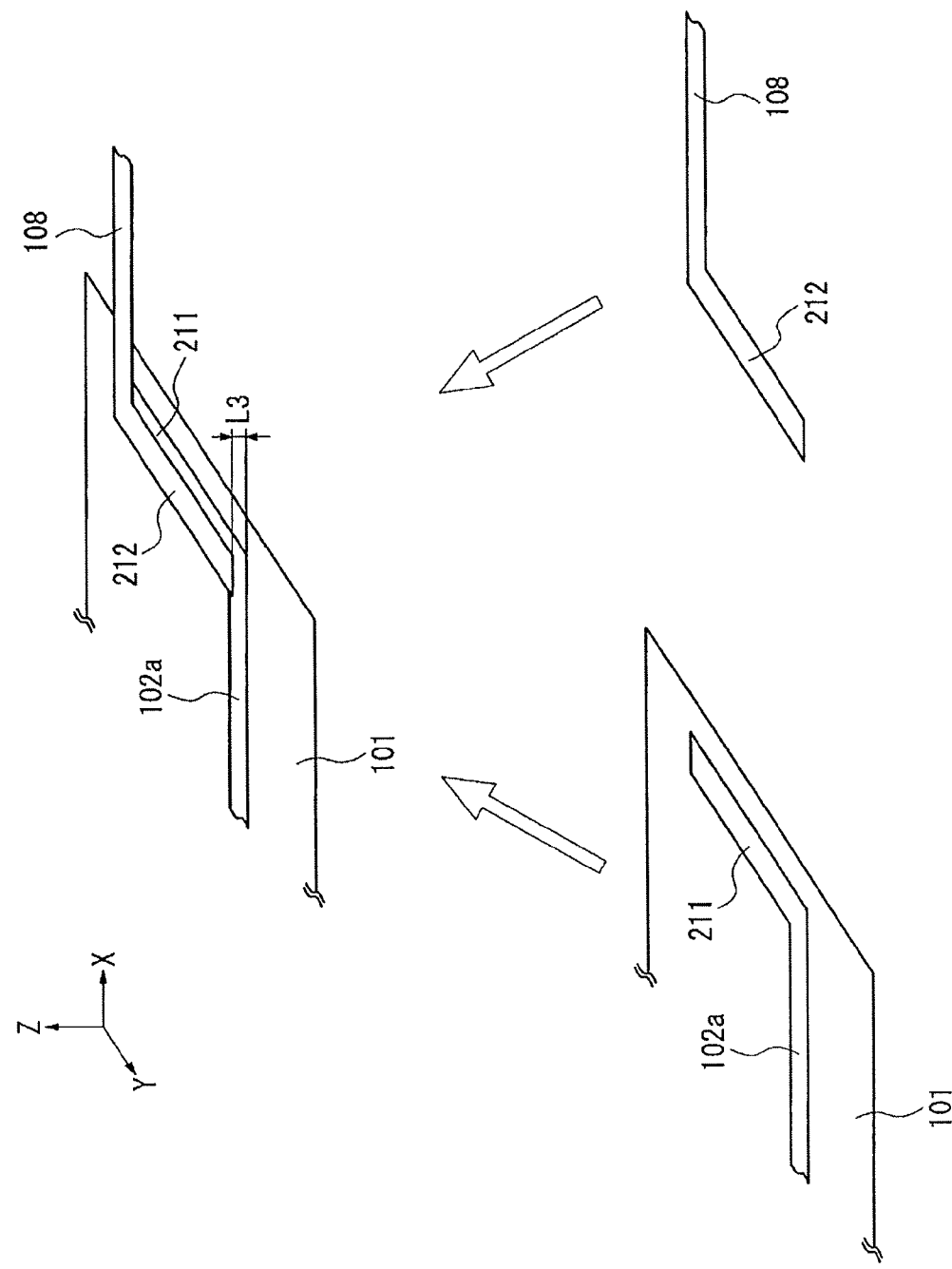
FIG. 5 is a perspective view illustrating the structure and arrangement of a signal communication unit 211 and an antenna 212 of the article management system 1 according to the first exemplary embodiment.
Figure 6:
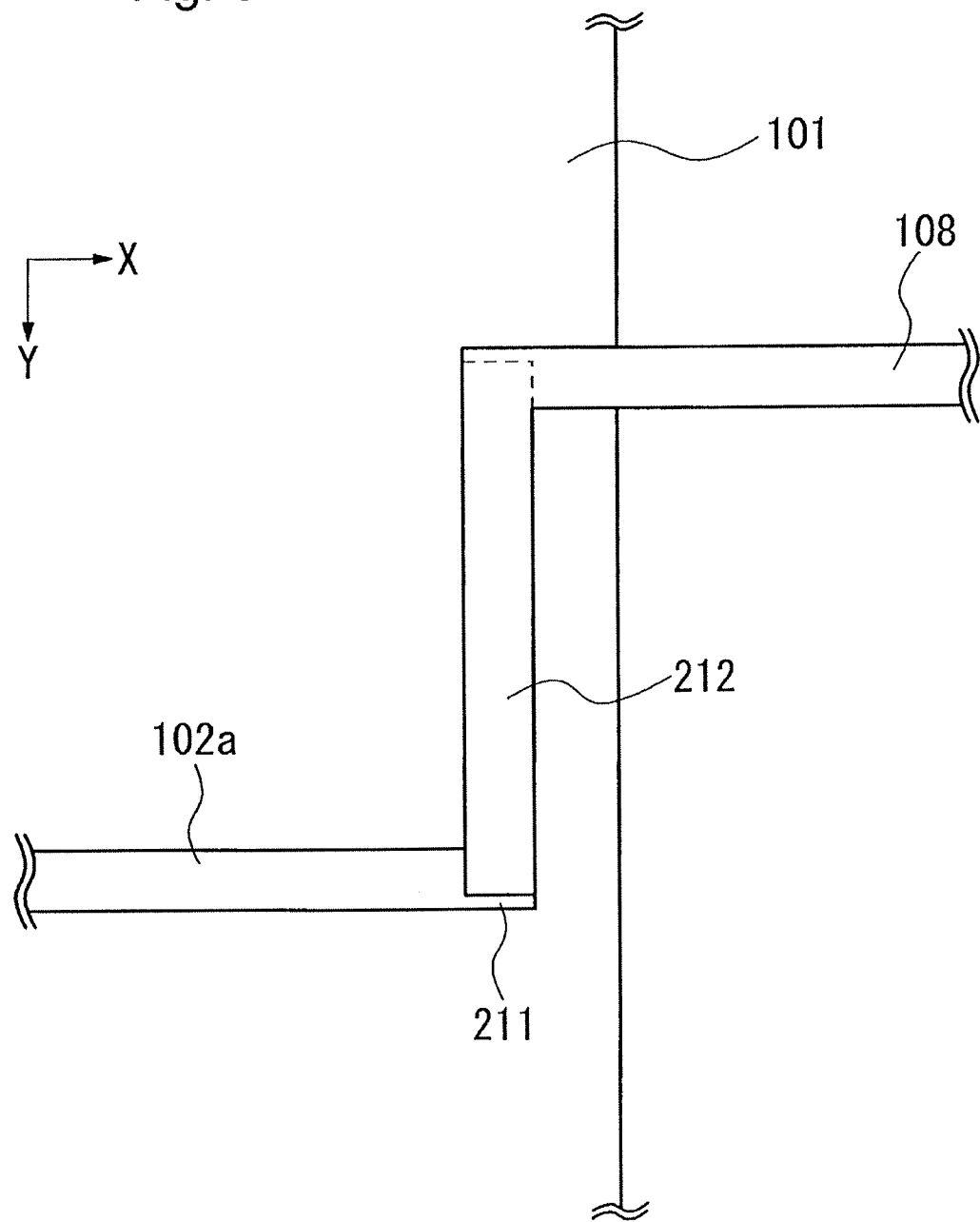
FIG. 6 is a top view of the signal communication unit 211 and the antenna 212 of the article management system 1 according to the first exemplary embodiment.

The structure and arrangement of the signal communication unit 211 and the antenna 212 of the article management system 1 according to the first exemplary embodiment will be described below. FIG. 5 is a perspective view illustrating the structure and arrangement of the signal communication unit 211 and the antenna 212 of the article management system 1 according to the first exemplary embodiment. FIG. 6 is a top view of the signal communication unit 211 and the antenna 212 of the article management system 1 according to the first exemplary embodiment.

The signal communication unit 211 is mounted at one end of the line 102a extending in the X-direction. In this example, the signal communication unit 211 is implemented in a line projecting in the −Y-direction from one end of the line 102a. The antenna 212 is implemented in a line projecting in the +Y-direction from the end portion of wiring 108 led from the RFID reader 103. The antenna 212 is placed above the signal communication unit 211, and not in contact with the signal communication unit 211. In this example, the distance between the signal communication unit 211 and the antenna 212 is defined as L3. Each of the signal communication unit 211 and the antenna 212 serves as a microstrip line constituted by an open-type transfer line and can trap electromagnetic waves in a traveling-wave type near-field of a transmission signal. The signal communication unit 211 and the antenna 212 are made of a strip conductor. With this configuration and arrangement, the signal communication unit 211 and the antenna 212 constitute a parallel-coupling transfer line coupler.

Figure 7:
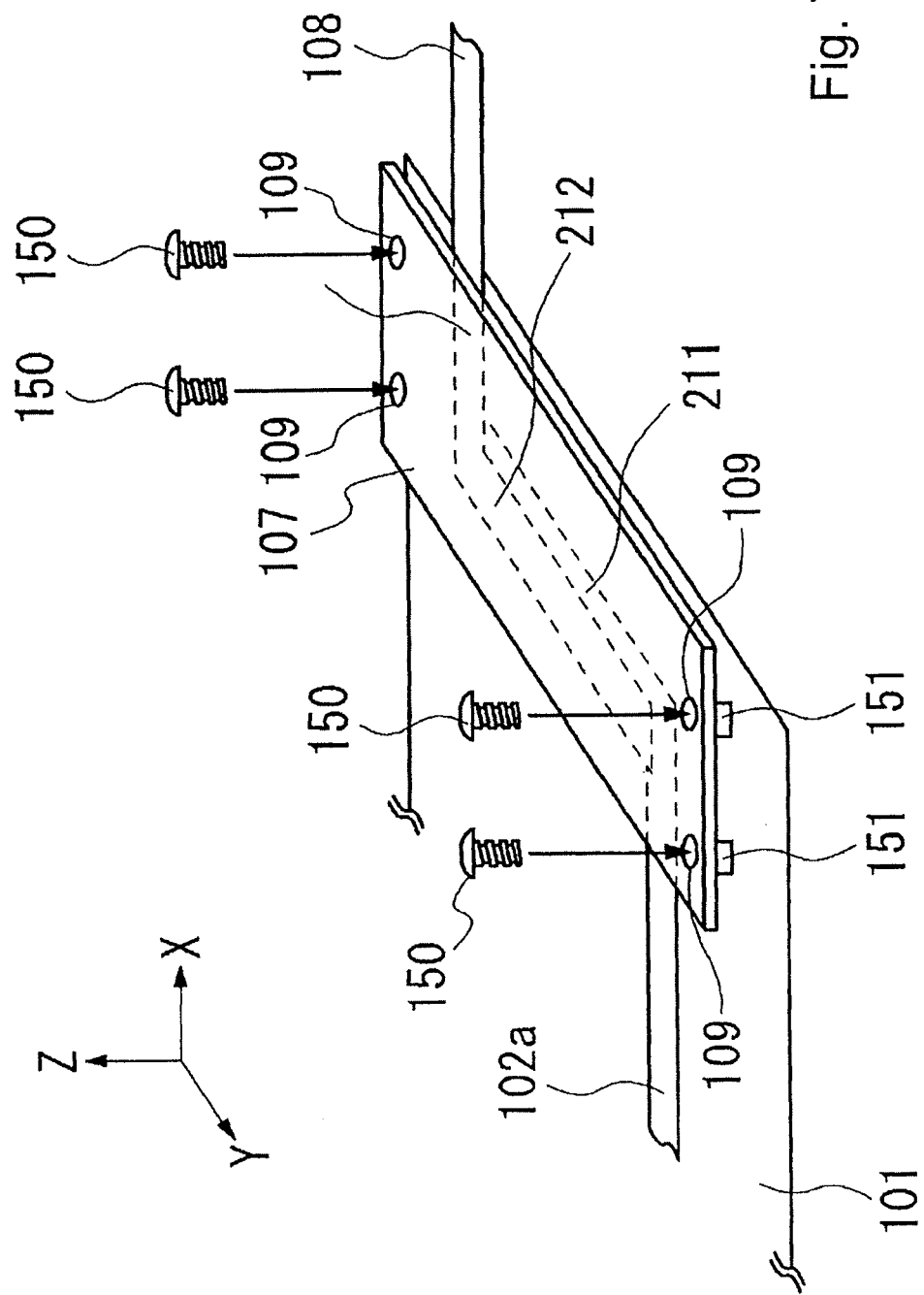
FIG. 7 is a perspective view of the signal communication unit 211 and the antenna 212 when a fixing plate is used.

To maintain a given positional relationship between the signal communication unit 211 and the antenna 212, the antenna 212 needs to be fixed with respect to the signal communication unit 211. For example, a fixing plate 107 can be placed above the antenna 212 as a means for fixing the antenna 212 with respect to the signal communication unit 211. FIG. 7 is a perspective view of the signal communication unit 211 and the antenna 212 when a fixing plate is used. The fixing plate 107 has a rectangular shape and includes spacers 108 formed at its four corners to project in the −Z-direction. The antenna 212 is attached to the lower surface (the surface in the −Z-direction) of the fixing plate 107. The fixing plate 107 includes screw holes 109 formed at its four corners to extend through the spacers 108. Screws 150 are passed through the screw holes 109 from the positions above the fixing plate 107 and fastened into screw holes (not illustrated) in the article management plate 101. This fastens the signal communication unit 211 and the antenna 212 with a spacing between them by the distance L3.

Each of the signal communication unit 211 and the antenna 212 can be formed using, as an open-type transfer line, a line that generates an electromagnetic field distribution mainly including quasi-static and induced electromagnetic fields around the transfer line, such as a coplanar line, a slot line, or a balanced two-wire transfer line. Since a coaxial cable or a waveguide that shields the periphery of the transfer line serves as a shielding transfer line that generates no such electromagnetic field around the transfer line, neither of them is available as the signal communication unit 211 and the antenna 212.

Figure 8:
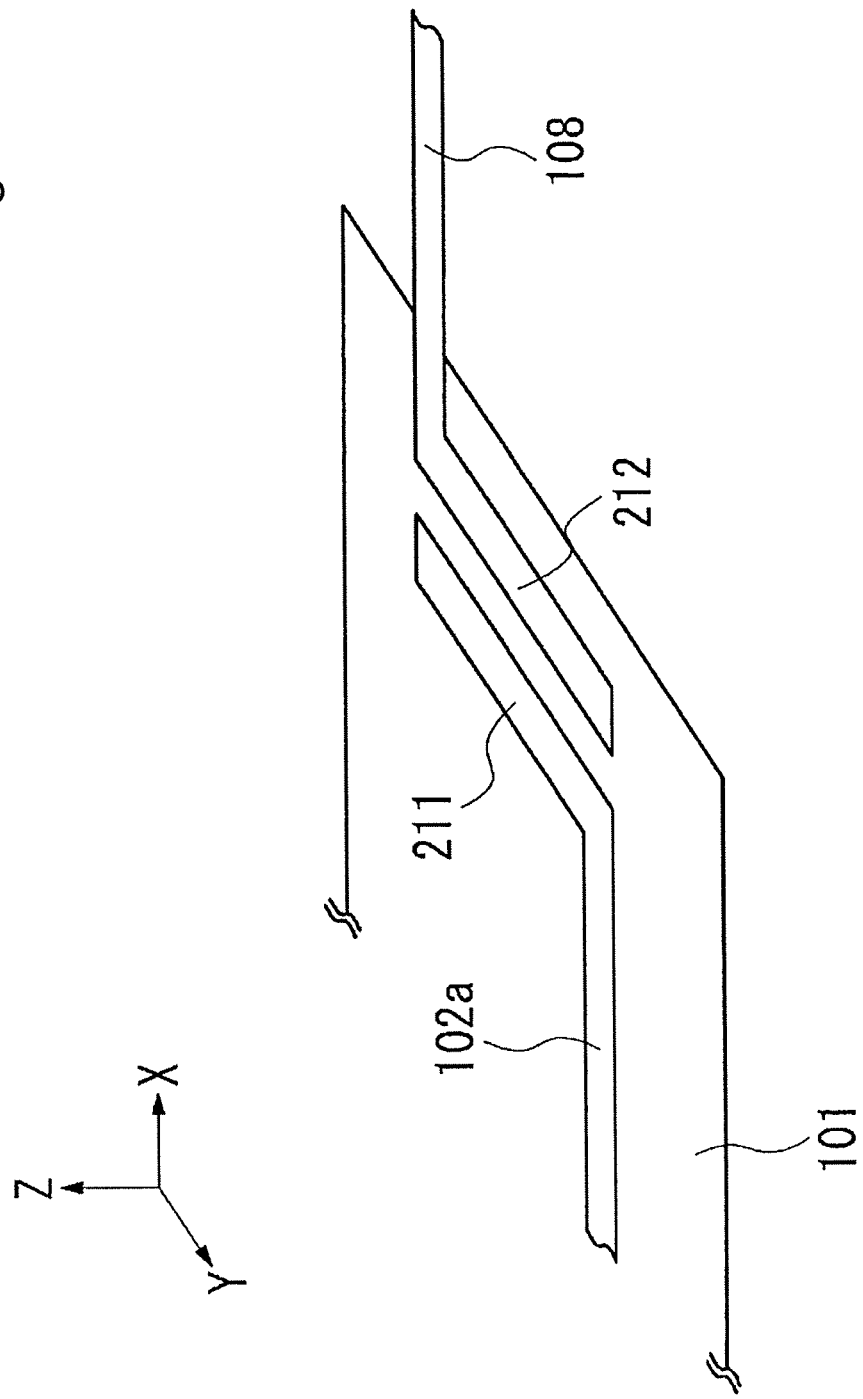
FIG. 8 is a perspective view illustrating another exemplary arrangement of the signal communication unit 211 and the antenna 212 of the article management system 1 according to the first exemplary embodiment.

An example in which the signal communication unit 211 and the antenna 212 are arranged vertically has been given above but is merely illustrative. The signal communication unit 211 and the antenna 212 can be placed at arbitrary positions as long as they can be electromagnetically coupled to each other. FIG. 8 is a perspective view illustrating another exemplary arrangement of the signal communication unit 211 and the antenna 212 of the article management system 1 according to the first exemplary embodiment. In this example, the signal communication unit 211 and the antenna 212 are placed on the article management plate 101 with a spacing between them. In other words, the signal communication unit 211 and the antenna 212 can be set on the same plane.

Figure 9:
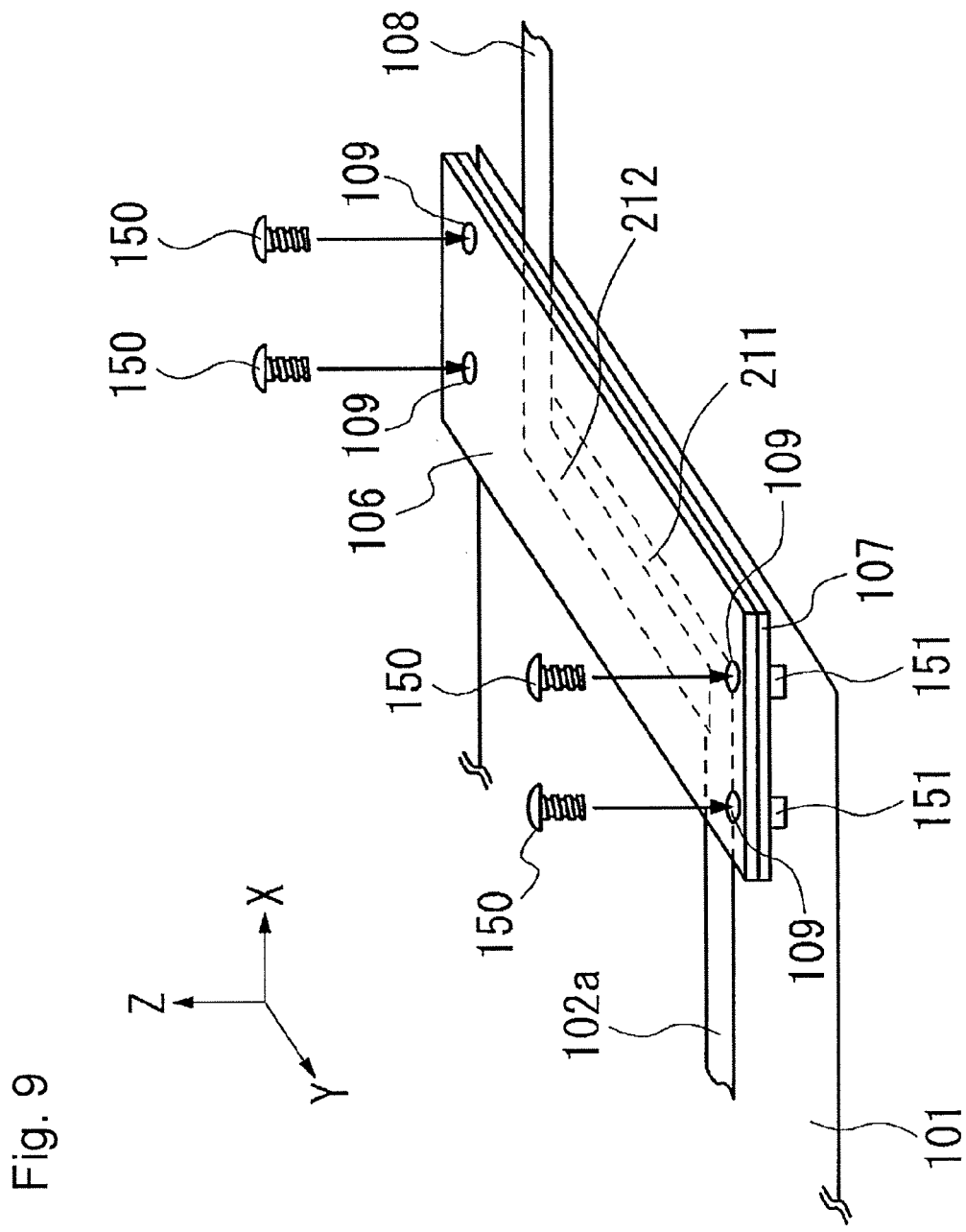
FIG. 9 is a perspective view illustrating a structure including a shielding plate 106 placed above the signal communication unit 211 and the antenna 212.

To suppress the influence of emission of transmission and response signals from the signal communication unit 211 and the antenna 212, a shielding plate can be placed above the antenna 212 to cover the signal communication unit 211 and the antenna 212. FIG. 9 is a perspective view illustrating a structure including a shielding plate 106 placed above the signal communication unit 211 and the antenna 212. Referring to FIG. 9, the shielding plate 106 is attached to the portion above the fixing plate 107 illustrated in FIG. 8. The shielding plate 106 is made of a conductor such as a metal. The shielding plate 106 is desirably connected to the ground. In the configuration illustrated in FIG. 9, the shielding plate 106 shields transmission and response signals emitted by the signal communication unit 211 and the antenna 212. This makes it possible to prevent an influence exerted on external communication devices and electronic devices and the RF tags 104 placed in their vicinities.

The position of connection between the signal communication unit 211 and the line 102a and the position of connection between the antenna 212 and the wiring 108 are not limited to this example.

Although the above description assumes that the signal communication unit 211 and the antenna 212 serve as rectilinear lines, the shapes of the signal communication unit 211 and the antenna 212 are not limited to this example. For example, the signal communication unit 211 and the antenna 212 can use coils or the like formed on the X-Y plane.

An example in which a signal communication unit and an antenna constitute an open ring coupler will be given below. In this example, a signal communication unit 213 and an antenna 214 constitute an open ring coupler. The signal communication unit 213 corresponds to the above-described signal communication unit 211 and the antenna 214 corresponds to the above-described antenna 212. FIG. 10 is a top view illustrating the signal communication unit 213 and the antenna 214 that constitute an open ring coupler.

The signal communication unit 213 serves as an annular line formed on the X-Y plane. In this example, the signal communication unit 213 includes an open portion 213a on the line on the +X side. The signal communication unit 213 is connected to the line 102a on the −X side of the annular line. The antenna 214 serves as an annular line formed on the X-Y plane. The antenna 214 includes an open portion 214a on the line of the −X side. The antenna 214 is connected to the wiring 108 on the +X side of the annular line.

The position of the open portion 213a of the signal communication unit 213 is merely an illustrative example, and an open portion can be formed at an arbitrary position on the annular line that constitutes the signal communication unit 213. The position of the open portion 214a of the antenna 214 is merely an illustrative example, and an open portion can be formed at an arbitrary position on the annular line that constitutes the antenna 214. The position of connection between the signal communication unit 213 and the line 102a and the position of connection between the antenna 214 and the wiring 108 are not limited to this example.

Referring to FIG. 10, the signal communication unit 213 and the antenna 214 are stacked on each other in the Z-direction, but this is merely an illustrative example. The signal communication unit 213 and the antenna 214 can be placed at arbitrary positions within the range in which the signal communication unit 213 and the antenna 214 can be electromagnetically coupled to each other. For example, the signal communication unit 213 and the antenna 214 can be set on the same X-Y plane.

Figure 11:
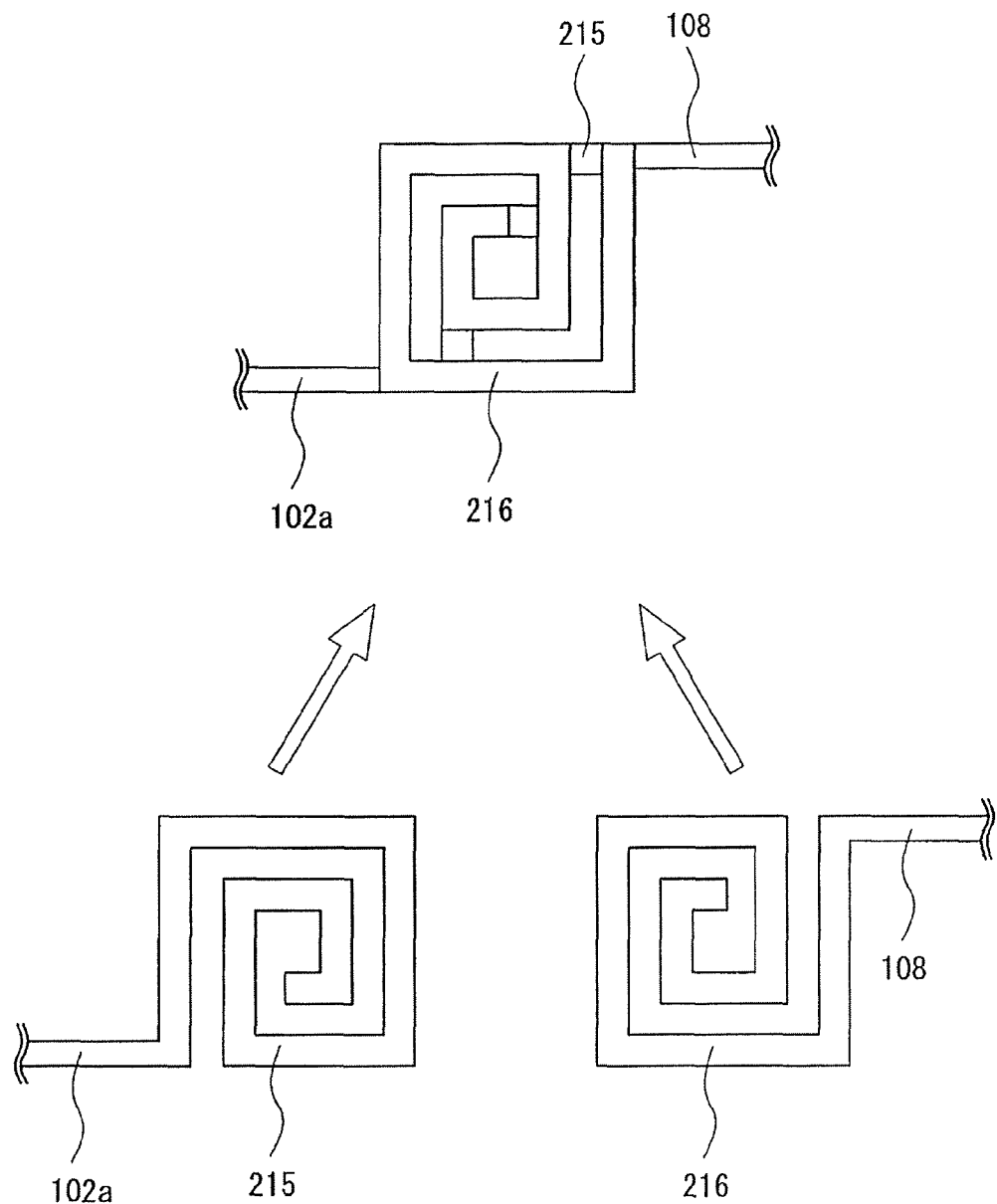
FIG. 11 is a top view illustrating a signal communication unit 215 and an antenna 216 that constitute a spiral coil coupler.

An example in which a signal communication unit and an antenna constitute a spiral coil coupler will be given below. In this example, a signal communication unit 215 and an antenna 216 constitute a spiral coil coupler. The signal communication unit 215 corresponds to the above-described signal communication unit 211 and the antenna 216 corresponds to the above-described antenna 212. FIG. 11 is a top view illustrating the signal communication unit 215 and the antenna 216 that constitute a spiral coil coupler. The above-described fixing plate 107 and shielding plate 106 can be set as appropriate, as a matter of course.

The signal communication unit 215 serves as a spiral coil-shaped line formed on the X-Y plane. In this example, the direction in which the spiral coil-shaped line that constitutes the signal communication unit 215 is wound is clockwise. The signal communication unit 215 is connected to the line 102a at the −X- and +Y-side end portion of the spiral coil-shaped line. The antenna 216 serves as a spiral coil-shaped line formed on the X-Y plane. In this example, the direction in which the spiral coil-shaped line that constitutes the antenna 216 is wound is clockwise. The antenna 216 is connected to the wiring 108 at the +X- and −Y-side end portion of the spiral coil-shaped line.

The directions of winding of the signal communication unit 215 and the antenna 216 can alternatively be set counterclockwise. The directions of winding of the signal communication unit 215 and the antenna 216 may be identical to or different from each other. The position of connection between the signal communication unit 215 and the line 102a and the position of connection between the antenna 216 and the wiring 108 are not limited to this example.

Referring to FIG. 11, the signal communication unit 215 and the antenna 216 are stacked on each other in the Z-direction, but this is merely an illustrative example. The signal communication unit 215 and the antenna 216 can be placed at arbitrary positions within the range in which the signal communication unit 215 and the antenna 216 can be electromagnetically coupled to each other. For example, the signal communication unit 215 and the antenna 216 can be set on the same X-Y plane. The above-described fixing plate 107 and shielding plate 106 can be set as appropriate, as a matter of course.

An advantageous effect that depends on the relationships among respective components of the article management system 1 will be described in more detail herein with reference to FIGS. 2 to 4 mentioned above.

First, in the article management system 1, the article to be managed 105 is placed above the tag transmission unit 112 of the RF tag 104 and spaced apart from the tag transmission unit 112 by the first distance L1, as illustrated in FIGS. 3 and 4. The line 102a connected to the RFID reader 103 is placed below the RF tag 104 and spaced apart from the tag transmission unit 112 by the second distance L2 representing the line-of-sight distance between the line 102a and the tag transmission unit 112. In this manner, in the article management system 1, the article to be managed 105 is placed in an area other than the area interposed between the line 102a and the RF tag 104. Therefore, the article to be managed 105 does not interrupt the line-of-sight vision of the line 102a and the RF tag 104.

In the article management system 1, the distance between the line 102a and the tag transmission unit 112 is defined as the second distance L2.

As described above, in the article management system 1, the first distance L1 between the article to be managed 105 and the tag transmission unit 112 and the second distance L2 representing the line-of-sight distance between the tag transmission unit 112 and the line 102a are adjusted. Further, in the article management system 1, adjusting the first distance L1 and the second distance L2, in turn, adjusts a coupling coefficient k2 between the article to be managed 105 and the tag transmission unit 112 and a coupling coefficient k1 between the tag transmission unit 112 and the line 102a. In the article management system 1, the signal intensity between the tag transmission unit 112 and the line 102a is changed in accordance with the coupling coefficient k2 that varies depending on the presence or absence of an article to be managed 105 to determine the presence or absence of the article to be managed 105 in accordance with the variation in signal intensity.

The advantageous effect of the article management system 1 according to the first exemplary embodiment based on the relationships among the first distance L1, the second distance L2, and the coupling coefficients k1 and k2 and their settings will be described below. First, the present invention uses electromagnetic coupling and coupling coefficients representing the strength of the electromagnetic coupling can be relatively easily evaluated by an electromagnetic field simulator. In the following description of electromagnetic coupling, letting λ be the wavelength of a radio signal between the tag transmission unit 112 and the line 102a, a region having a distance from a wave source smaller than λ/2π (π: the ratio of the circumference of a circle to its diameter) is defined as a reactive near-field, a region having a distance of λ/2π (exclusive) to λ (exclusive) is defined as a radiative near-field, and a combination of these two regions is defined as a near-field region.

In this near-field region, the electromagnetic field appears as a complex phase, and quasi-static, induced, and radiated electromagnetic fields exist at a non-negligible strength ratio. The vector of a synthesis of these electromagnetic fields also undergoes various spatial or temporal variations. When, as an example, the wave source has a configuration similar to a minute dipole antenna structure, the electric field E [V/m] formed by this wave source and the magnetic field H [A/m] can be expressed using the spherical coordinate system (γ, θ, φ) and a phasor representation, as:

[Mathematical 1]

$$E_\theta = \frac{ql}{4\pi\varepsilon}\left\{\frac{1}{r^3} + \frac{1}{r^2}\cdot\frac{1}{(\lambda/2\pi)}\cdot e^{j\frac{\pi}{2}} + \frac{1}{r}\cdot\frac{1}{(\lambda/2\pi)^2}\cdot e^{j\pi}\right\}\cdot e^{-jkr}\cdot\sin\theta \quad (1)$$

[Mathematical 2]

$$E_r = \frac{ql}{2\pi\varepsilon}\left\{\frac{1}{r^3} + \frac{1}{r^2}\cdot\frac{1}{(\lambda/2\pi)}\cdot e^{j\frac{\pi}{2}}\right\}\cdot e^{-jkr}\cdot\cos\theta \quad (2)$$

[Mathematica 3]

$$H_\phi = \frac{ql}{4\pi\sqrt{\varepsilon\mu}}\left\{\frac{1}{r^2}\cdot\frac{1}{(\lambda/2\pi)}\cdot e^{j\frac{\pi}{2}} + \frac{1}{r}\cdot\frac{1}{(\lambda/2\pi)}\cdot e^{j\pi}\right\}\cdot e^{-jkr}\cdot\sin\phi \quad (3)$$

[Mathematical 4]

$$E_\phi = H_\theta = H_r = 0 \quad (4)$$

In equations (1) to (4) presented above, q [C] is the charge stored in the wave source of the minute dipole antenna structure, l [m] is the length of the wave source of the minute dipole antenna structure, λ [m] is the wavelength, and γ [m] is the distance from the wave source to the point of observation. Further, π is the ratio of the circumference of a circle to its diameter, ∈ is the dielectric constant, and μ is the magnetic permeability. In equations (1) to (4), the term that is proportional to $1/\gamma^3$ represents a quasi-static electromagnetic field, the term that is proportional to $1/\gamma^2$ represents an induced electromagnetic field, and the term that is proportional to $1/\gamma$ represents a radiated electromagnetic field. Since these electromagnetic field components have different dependences on each distance γ, their relative strengths vary depending on the distance γ.

Next, FIG. 12 is a table representing the dependences of the relative strengths of quasi-static, induced, and radiated electric fields in the electric field $E_\theta$ on the distance $\gamma$ normalized by the wavelength $\lambda$. The second row of the table illustrated in FIG. 12 shows the distance corresponding to a free space wavelength of 950 MHz that is nearly equal to the RFID frequency in the UHF (Ultra High Frequency) band permitted by the Radio Law of Japan.

As can be seen from the table illustrated in FIG. 12, as the distance $\gamma$ gets larger, the strength of each electric field gets lower, and the ratio between respective components varies accordingly. For example, in the region having $\gamma<\lambda/2\pi$, the electric field strength descends in the order of quasi-static, induced, and radiated electric fields, while in the region having $\gamma>\lambda/2\pi$, the electric field strength ascends in the order of quasi-static, induced, and radiated electric fields. In the region having $\gamma>\lambda$, quasi-static and induced electric fields make very little contribution, while in the far-field region having $\gamma>2\lambda$, radiated electric field components remain almost exclusively. In the region having $\gamma<\lambda$, quasi-static and induced electric fields still make a sufficient contribution, while in the reactive near-field having $\gamma<\lambda/2\pi$, quasi-static and induced electric fields make a great contribution. As seen in equations (1) to (4), compared to a radiated electric field, quasi-static and induced electromagnetic fields include not only $\theta$-components but also $\gamma$- and $\phi$-components, that is, include components in various directions.

In general, in the reactive near-field, quasi-static and induced electromagnetic fields remaining in the vicinity of the wave source are thus dominant and the absolute electromagnetic field strength is naturally high, compared to a radiated electromagnetic field that is emitted by the wave source into the space and propagates. In the radiative near-field, in general, the larger the distance from the wave source, the lower the absolute electromagnetic field strength. Then, the relative strengths of quasi-static and induced electromagnetic fields are comparatively low while the relative strength of a radiated electromagnetic field is comparatively high. As described above, in the near-field region, quasi-static and induced electromagnetic fields exist which couple the line 102a and the tag transmission unit 112 to each other and couple the tag transmission unit 112 and the article to be managed 105 to each other.

In a passive RFID system that uses the general UHF or microwave band, the distance $\gamma$ between the line 102a and the tag transmission unit 112 satisfies a relation $\gamma>\lambda$, and a radiated electromagnetic field is used for radio communication. To efficiently generate such a radiated electromagnetic field, the line 102a uses the same structure as a resonant antenna structure typified by a patch antenna structure. When the line 102a having such a structure is used in the near-field region having $\gamma<\lambda$, the electromagnetic field strength considerably varies depending on the position because of the presence of a standing wave in the line 102a. For example, the amplitude is largest around the antinodes of a standing wave and is zero at the nodes of the standing wave. Thus, when the distance $\gamma$ between the line 102a and the tag transmission unit 112 satisfies a relation $\gamma<\lambda$, no signal can be received from the line 102a by the tag transmission unit or the received signal intensity is very low, in a portion close to any node of the standing wave in the line 102a. In other words, a dead region is formed, thus hindering the use of the system.

Under such circumstances, the system disclosed in PTL 5 must inevitably take the form in which the RFID reader is sufficiently spaced apart from the shelf that holds the articles, the article to be managed 105, and the RF tag to allow the line 102a sufficiently smaller than the shelf to emit radio waves to set the coverage area large. The system disclosed in PTL 5, therefore, requires a wide space between the RFID reader and the RF tag. Depending on the material of the shelf, especially in the use of a metal shelf or the like, multipath phenomena occur so interference of radio waves results in instable reading of the tags or hampers reading of the tag information. Assume herein that a person or an object enters the space between the line 102a and the position where any article is placed. Then, as in the case where an article is present, the tag is unreadable, so the presence of an article is erroneously detected even in the absence of an article.

A coupling circuit can also be formed by electromagnetic coupling between the line 102a and the RF tag 104 through quasi-static and induced electromagnetic fields present in the near-field region having $\gamma<\lambda$ and more desirably, the reactive near-field having $\gamma<\lambda/2\pi$. In this case, no wide space is required between the RFID reader and the RF tag, according to the conditions involved. However, when the same structure as a resonant antenna structure is simply for the line 102a, a dead region is formed, thus hindering the use of the system. In addition, a standing-wave antenna structure generally has a size of about $\lambda$ and therefore has too small a coverage area when used in proximity to the tag.

In the article management system 1 according to the first exemplary embodiment, the line 102a connected to the RFID reader 103 is constituted by an open-type transfer line terminated with matching termination, and the RF tag 104 is placed to allow electromagnetic coupling between the open-type transfer line and the tag transmission unit 112 of the RF tag 104. In the article management system 1, an open-type transfer line that emits only a few radio waves is used as the line 102a of the RFID reader 103 to form a coupling circuit by electromagnetic coupling between the line 102a and the tag transmission unit 112 through quasi-static and induced electromagnetic fields generated around the open-type transfer line. In other words, it can be appreciated that the article management system 1 has a traveling-wave antenna structure which operates an open-type transfer line in the near-field region. This configuration obviates the need for a wide space between the line 102a and the RF tag 104. Since radio communication between the line 102a and the tag transmission unit 112 is done at close range through the coupling circuit, it is possible to suppress erroneous detection due to multipath phenomena or entrance of a person or an object into the space between the line 102a and the area in which any article to be managed 105 is placed. Further, since an open-type transfer line terminated with matching termination is used as the line 102a, the main components of an electromagnetic wave propagating through the line 102a generate no standing wave and propagate to the matching terminal as a traveling wave. The generation of no standing wave precisely means herein that the standing wave is sufficiently small and typically exhibits a standing wave ratio of 2 or less and desirably 1.2 or less.

When the terminal of the transfer line is matched with sufficient accuracy or an electromagnetic wave propagating through the transfer line sufficiently attenuates around the terminal, a traveling wave serves as a main component without generation of a large standing wave within the transfer line. A traveling-wave antenna structure can be formed using an electromagnetic field distribution in such a transfer line. An electromagnetic field formed in the space around the line includes less radiated electromagnetic field and mainly includes static and induced electromagnetic fields. The strengths of the static and induced electromagnetic fields are higher than that of the radiated electromagnetic field, and then the RF tag 104 obtains a relatively strong electromagnetic field even when the reader operates with the same output. In other words, an environment which scatters no radiated electromagnetic field to the surroundings can be formed while ensuring a given tag operation.

In a standing-wave antenna structure such as a commonly-used patch antenna structure, the electromagnetic field distribution in the vicinity of the line 102a is too uneven depending on the standing wave within the line 102a. To avoid a dead portion, the area in which the article to be managed 105 can be managed is limited. In contrast to this, in the traveling-wave antenna structure constituted by an open-type transfer line described in the present exemplary embodiment, the electromagnetic field distribution includes no portions remaining unchanged, such as nodes, even in the vicinity of the line 102a and always varies everywhere. Therefore, since the electromagnetic field is free from unevenness because of the presence of a standing wave that follows the line 102a even in the near-field region, no area is formed in which the tag information of the RF tag 104 is unreadable. In other words, the degree of freedom of arrangement of the line 102a and the tag transmission unit 112 improves.

In the article management system 1, since radio communication is done through electromagnetic coupling between the line 102a and the tag transmission unit 112 using the traveling wave as a signal, no dead region is formed, thus allowing the use of the system, unlike a resonant antenna structure. Hence, in the article management system 1, the coverage area can be set large by extending the open-type transfer line irrespective of wavelength within the range in which the strengths of quasi-static and induced electromagnetic fields generated around the transfer line are high enough to activate the RF tag 104. In other words, the article management system 1 according to the first exemplary embodiment uses the above-mentioned open-type transfer line to keep the radiation loss of power low and facilitate an increase in coverage area.

The open-type transfer line basically means herein a transfer line that is of the open type intended to transfer electromagnetic waves in the longitudinal direction of the line while suppressing radiation. Examples include a balanced two-wire transfer line and the like, transfer lines such as a microstrip line, a coplanar line, and a slot line, and a grounded coplanar line and a tri-plate line that are modifications to these transfer lines. Further, according to the circumstances involved, an antenna structure extending in a plane, which changes the electromagnetic field in a gap region interposed between meshed and sheet-like conducting portions and in a leakage region on the exterior of the meshed conducting portion and communicates signals, is also applicable. The antenna structure extending in a plane has a standing wave mixed, also operates as a traveling-wave antenna structure albeit imperfectly, and is therefore available as long as unevenness of the electromagnetic field distribution generated by the standing wave is negligible. On the other hand, a shielding transfer line that generates no such electromagnetic field around the transfer line, such as a coaxial cable or a waveguide that shields the periphery of the transfer line, is unavailable.

An electromagnetic-wave transfer sheet is available which allows an electromagnetic field to exist in a gap region interposed between opposed conductive sheet bodies and to travel in a desired direction by changing the voltage across the two conductive sheet bodies to change the electromagnetic field or changing the voltage across the conductive sheet bodies in response to a variation in electromagnetic field. In a broader sense, the electromagnetic-wave transfer sheet may also be construed as one type of open-type transfer line according to the present invention, as viewed in the longitudinal direction of the sheet. Note, however, that in the electromagnetic-wave transfer sheet, the transmission coefficient fluctuates because of the presence of a standing wave within the sheet so the standing wave is very large. Therefore, the electromagnetic-wave transfer sheet is not necessarily optimum for the practice of the present invention. In addition, in the electromagnetic-wave transfer sheet, since the upper surface of the waveguide is made of a metal mesh sufficiently finer than the wavelength, an evanescent wave can be said to leak from the upper surface. In such a transfer line generally provided with a plurality of slots that allow the electromagnetic field to leak out at an interval, a width, and a length that are $\frac{1}{10}$ or less of the wavelength can be construed as one type of open-type transfer line for the article management system 1 according to the first exemplary embodiment.

The open-type transfer line of the article management system 1 according to the first exemplary embodiment is different from a so-called crank-line antenna structure or meander-line antenna structure that obtains a predetermined radiated electromagnetic field strength by designing a crank shape intended to emit radiation from the open-type transfer line or positively using the higher-order mode, and a traveling-wave antenna structure intended to emit electromagnetic radiation in the far-field using a leakage coaxial cable or the like. Since radiation occurs preferentially from crank structures or slots periodically formed with a size nearly equal to the wavelength, generally a size that is $\frac{1}{10}$ or more of the wavelength, the electromagnetic field strength greatly varies in each individual position, as in the above-described resonant antenna structure. Therefore, the use of the system in the near-field region may result in instable reading of the tag information or even the impossibility of reading of the tags depending on the position, thus hindering the use of the system. In the UHF-band RFID system, different frequencies are allocated to individual countries in the world and are distributed in a band of approximately 860 to 960 MHz. This means that the relative band is as wide as about 10% and a significant change is needed for design of resonant points of the resonant antenna structure or the period of cranks, meanders, or slots. On the other hand, in the article management system 1 according to the first exemplary embodiment, since an open-type transfer line having a very wide band is used from the first, the same structure is usable as the line 102a with no special change.

With the article management system 1 according to the first exemplary embodiment, the distribution area in which articles to be managed are placed 110 to place the article to be managed 105 is spaced apart from the RF tag 104 to allow electromagnetic coupling between the article to be managed 105 and the tag transmission unit 112 of the RF tag 104. Therefore, when an article to be managed 105 is present, the article to be managed 105 and the tag transmission unit 112 form a coupling circuit, so that the resonant frequency of the tag transmission unit 112 or the feeding point impedance of the tag transmission unit 112 varies, compared to the case where an article to be managed 105 is absent. Since the tag transmission unit 112 is designed to resonate at the frequency of a signal used for radio communication in a free space and have its feeding point impedance adjusted to maximize the reception sensitivity. The above-mentioned variation lowers the reception sensitivity and even adversely affects the operation of the tag transmission unit 112 in sending a reflected signal to the RFID reader 103. As a result, the power reception sensitivity to a signal used for radio communication lowers. The transmission output of a signal reflected from the RF tag 104 also lowers. It, therefore, becomes impossible for the RF tag 104 to receive a signal from the RFID reader 103, to ensure a given operating power of the tags because of the low power reception strength of the signal, or to generate a sufficiently strong reflected electromagnetic field. As a result, the RFID reader 103 cannot read the tag information of the RF tag 104. Alternatively, the strength or phase of a reflected electromagnetic field that reaches the RFID reader 103 considerably varies in response to a variation in resonant frequency or the like. In other words, when an article to be managed 105 is located in the distribution area in which articles to be managed are placed 110, the strength or phase of an electromagnetic field reflected from the RF tag 104 considerably varies, compared to the case where the tag information is unreadable or no article to be managed 105 is present, so that the RFID reader 103 can detect the presence of the article to be managed 105. In other words, in response to a variation in operating characteristic of the tag transmission unit 112 because of the presence or absence of an article to be managed 105, the RFID reader 103 can detect a variation in intensity or phase of a signal reflected from the RF tag 104 and, in turn, detect the presence or absence of an article to be managed from the detection result.

As described above, in the article management system 1 according to the first exemplary embodiment, an article to be managed 105 need not always interrupt the line-of-sight vision of the RF tag 104 and the RFID reader 103 upon detection of the presence or absence of the article to be managed 105. Instead, the position where an article to be managed 105 is placed need only be spaced apart from the tag transmission unit 112 (or the RF tag 104) to allow electromagnetic coupling between the article to be managed 105 and the tag transmission unit 112. Hence, the placement of an article to be managed is not particularly limited to the position between the RFID reader 103 and the RF tag 104 and an article to be managed can be freely placed.

The article management system 1 according to the first exemplary embodiment determines that an article is placed in the vicinity of the tag transmission unit 112 supplied with power, not simply in consideration of a variation in operating characteristic of the line 102a, but based on evaluation of the result of reading of the tag information by the RFID reader 103 in consideration of a variation in operating characteristic of the tag transmission unit 112. This makes it possible to set the degree of freedom of relative position between the line 102a and the RF tag 104 high and, in turn, to improve the degree of freedom of relative position between the line 102a and the position where an article to be managed 105 is placed, with the RF tag 104 interposed between them. An electromagnetic field formed by the tag transmission unit 112 at the position where an article to be managed 105 is placed includes components of not only a radiated electromagnetic field but also quasi-static and induced electromagnetic fields. The electromagnetic field components are spread in various directions, compared to the presence of components of a radiated electromagnetic field in the normal far-field. Hence, the article management system 1 according to the first exemplary embodiment can attain a high degree of freedom of relative position between the article to be managed and the tag.

The article management system 1 according to the first exemplary embodiment basically serves as an RFID system, which uses RF tags 104 having unique IDs (tag information) and allows multiple access based on the tag information. Thus, when the tag information of the RF tag 104 is associated with the position where an article to be managed 105 is placed, the position of the article to be managed 105 can be specified based on unreadable tag information of the RF tag 104. If no article to be managed 105 is present, the RF tag 104 responds to a signal from the RFID reader 103, which can read the tag information of the RF tag 104. Accordingly, when no article to be managed 105 is present, since the tag information of the RF tag 104 is readable with the strength of a normal reflected electromagnetic field, the absence of the article to be managed 105 can be detected. The position where no article to be managed 105 is placed can be specified based on the tag information of a readable RF tag 104. A plurality of articles to be managed 105 can also be managed by specifying the positions where articles to be managed 105 are placed, as different pieces of tag information are associated with these positions. Since the presence or absence of an article to be managed 105 can be detected in the aforementioned way, the article management system 1 according to the first exemplary embodiment can manage the presence or absence of an article to be managed 105 without the need to attach the RF tag 104 to the article to be managed.

In the article management system 1 according to the first exemplary embodiment, the position where an article to be managed 105 is placed need only be spaced apart from the RF tag 104 to allow electromagnetic coupling between the article to be managed 105 and the tag transmission unit 112 of the RF tag 104. Hence, since RF tags 104 are not attached to the articles to be managed 105 and can be repeatedly used, the RF tags 104 involve a cost per article almost equal to the value of the tag divided by the number of times the tag is used. In other words, the problem that the RF tags 104 entail high costs can be naturally solved by repeatedly using them a sufficient number of times.

In the article management system 1 according to the first exemplary embodiment, since no RF tag 104 is attached to an article to be managed 105, neither violation of privacy nor information security concerns result from unauthorized reading of an RF tag 104 attached to the article to be managed 105. In other words, the article management system 1 according to the first exemplary embodiment poses no problems resulting from unauthorized reading of the tag information by a third party.

In the article management system 1 according to the first exemplary embodiment, letting $\lambda$ be the wavelength of a signal used for radio communication by the RFID reader 103 and the RF tag 104, the distribution area in which articles to be managed are placed 110 to place an article to be managed 105 is set such that the first distance L1 between the article to be managed 105 and the tag transmission unit 112 satisfies a relation $L1 \leq \lambda$. In the article management system 1 according to the first exemplary embodiment, the second distance L2 representing the line-of-sight distance between the line 102a of the RFID reader 103 and the tag transmission unit 112 of the RF tag 104 satisfies $L2 \leq \lambda$. The distance in the article management system 1 according to the first exemplary embodiment means the distance in radio wave propagation and is nearly equal to a geometrical minimum distance.

As long as the distance L1 between the distribution area in which articles to be managed are placed 110 to place an article to be managed 105 and the tag transmission unit 112 of the RF tag 104 satisfies a relation $L1 \leq \lambda$, the position where an article is placed falls within the near-field range as viewed from the RF tag 104. Therefore, when quasi-static and induced electric fields make a satisfactory contribution, the article to be managed 105 contains a high-permittivity material such as moisture or a metal, and the article to be managed 105 is located in the distribution area in which articles to be managed are placed 110, the tag transmission unit 112 and the article to be managed 105 can be electromagnetically coupled to each other through a quasi-static or induced electromagnetic field. Since the human body contains a large amount of moisture and can be detected as the article to be managed 105, the system can also be employed in human flow management or the like.

Setting the first distance L1 to satisfy $L1 \leq \lambda$ causes components of quasi-static and induced electromagnetic fields to exist within the near-field region of the tag transmission unit 112 with a non-negligible strength. The components of these electromagnetic fields cause electromagnetic coupling between the tag transmission unit 112 and the article to be managed 105 via, for example, a mutual inductance or capacitance. When this occurs, the circuit constant of the tag transmission unit 112 varies depending on the presence or absence of an article to be managed 105, and the operating characteristics of the tag transmission unit 112, in turn, vary. As a more easily understandable variation that depends on the presence or absence of an article to be managed 105, the resonant frequency of the tag transmission unit 112 varies. When a generally commercially-available RF tag is used as the RF tag 104 to keep the system cost less, the tag transmission unit 112 has a standing-wave antenna structure basically serving as a dipole antenna structure. In such an RF tag 104, the resonant frequency of the tag transmission unit 112 is set in accordance with the radio communication frequency to achieve high sensitivity. The state in which the resonant frequency of the tag transmission unit 112 resonates at a set frequency in this manner corresponds to the state in which no article to be managed 105 is present.

When an article to be managed 105 is placed on the RF tag 104, the tag transmission unit 112 is coupled to the article to be managed 105, thus approximately lowering the resonant frequency. This seriously lowers the sensitivity of the tag transmission unit 112 at the radio communication frequency. If, for example, sufficient operating power cannot be supplied to the RFID chip 111 due to the low reception sensitivity, the RF tag 104 does not respond to a query from the RFID reader 103. Alternatively, even if sufficient operating power is available, the tag transmission unit 112 cannot change the electromagnetic field in a space in which the field strength is sufficiently high, based on a modulated signal generated by the RFID chip 111.

As a result, when an article to be managed 105 is present, the RF tag 104 stops responding to a query from the RFID reader 103, or the strength of an electromagnetic field reflected from the RF tag 104 considerably varies, compared to the case where no article to be managed 105 is present. Detecting, by the RFID reader 103, the variation in strength of the reflected electromagnetic field makes it possible to determine that no article to be managed 105 is present. This processing of determination can be performed by, for example, a computer. As described above, the article management system 1 according to the first exemplary embodiment can detect and manage the presence or absence of an article to be managed 105 without attaching an RF tag 104 to the article to be managed 105.

In the article management system 1 according to the first exemplary embodiment, to cause a variation in response of the RF tag 104 that depends on the presence or absence of an article to be managed 105, the first distance L1 between the RF tag 104 and the article to be managed 105 need only satisfy a relation $L1 \leq \lambda$, and the article to be managed 105 need not interrupt the line-of-sight vision of the RF tag 104 and the line 102a. In other words, the placement of an article to be managed 105 is not limited to the position between the RF tag 104 and the tag transmission unit 112 of the RFID reader 103, thus improving the degree of freedom of placement. In, for example, detecting the presence or absence of commodities on the shelves of retail stores, a line 102a and RF tags 104 can be embedded within the shelf plates to hide the line 102a, thus achieving very excellent appearance as well.

Although a scheme in which a variation in signal intensity is detected based on a shift of the resonant frequency of the tag transmission unit 112 with respect to the radio communication frequency has been mainly described herein, the present invention is not limited to this. When the resonant frequency shifts, the radio communication frequency may be swept by the reader within the range permitted by the law concerned to detect the shift of the resonant frequency, thereby detecting the presence or absence of an article. The phase greatly varies before and after the resonant frequency. Therefore, the presence or absence of an article can be detected by observing a variation in phase as well, as a matter of course.

As in the above-mentioned first distance L1, when the line-of-sight distance L2 between the tag transmission unit 112 and the line 102a satisfies a relation $L2 \leq \lambda$, the line 102a and the tag transmission unit 112 fall within the near-field range. The line-of-sight distance L2 means herein the distance between the tag transmission unit 112 and a strip conductor acting as a particularly strong wave source in the line 102a. Setting the line-of-sight distance L2 to $\lambda$ or less allows quasi-static and induced electric fields to make a sufficient contribution to allow electromagnetic coupling between the line 102a and the tag transmission unit 112. Especially in the article management system 1 according to the first exemplary embodiment, since the presence or absence of an article is determined based on an analog quantity representing the strength of an electromagnetic field reflected from the RF tag 104, a variation in reflected electromagnetic field strength resulting from interference of radio waves is more likely to cause erroneous detection. However, with this configuration, the article management system 1 according to the first exemplary embodiment mainly uses direct waves for radio communication between the line 102a and the tag transmission unit 112 so that interference of radio waves is less likely to occur due to multipath phenomena. This can suppress erroneous detection. An electromagnetic field formed by the line 102a and the tag transmission unit of the RF tag 104 includes components of not only a radiated electromagnetic field but also quasi-static and induced electromagnetic fields. The electromagnetic field components are spread in various directions, compared to the presence of only components of a radiated electromagnetic field in the normal far-field. Hence, the article management system 1 according to the first exemplary embodiment can attain a high degree of freedom of relative position between the line 102a and the RF tag 104.

In the article management system according to the first exemplary embodiment, since the presence or absence of an article is determined based on an analog quantity representing a variation in strength or phase of an electromagnetic field reflected from the RF tag 104 or a variation in resonant frequency of the tag transmission unit 112, interference of radio waves that depends on the ambient environment is more likely to cause erroneous detection. However, with the article management system 1 according to the first exemplary embodiment, satisfying a relation $L2 \leq \lambda$ allows the predominant use of direct waves for radio communication between the line 102a and the tag transmission unit 112 so that interference of radio waves is less likely to occur due to multipath phenomena reflecting the ambient environment. This can suppress erroneous detection. Especially in managing the presence or absence of commodities on the shelves, the shelves may be made of a metal or serve as metal refrigeration cases in many cases, but this system can be stably operated even under such an environment.

In the article management system 1 according to the first exemplary embodiment, upon satisfaction of a relation $L2 \leq \lambda$, the line-of-sight distance L2 between the line 102a and the RF tag 104 is about 0.3 m or less in the UHF band that is one of the RFID standard frequencies and about 0.12 m or less in the 2.4-GHz band. The distance L1 between the distribution area in which articles to be managed are placed 110 and the RF tag 104 also satisfies a relation $L1 \leq \lambda$, and is therefore about 0.3 m or less in the UHF band that is one of the RFID standard frequencies and about 0.12 m or less in the 2.4-GHz band. The interval between the line 102a and the distribution area in which articles to be managed are placed 110 is as narrow as the same order. Hence, using the article management system 1 according to the first exemplary embodiment to narrow the interval between the article to be managed 105 and the RF tag 104 or line 102a, entrance of an object or a person different from the article to be managed 105 can be inhibited to suppress erroneous detection.

In the article management system 1 according to the first exemplary embodiment, the first distance L1 satisfies a relation $L1 \leq \lambda/2\pi$ where $\pi$ is the ratio of the circumference of a circle to its diameter. When the article to be managed 105 influences the frequency characteristics of the tag transmission unit 112 and falls within the reactive near-field range in which the first distance L1 satisfies a relation $L1 \leq \lambda/2\pi$, an electromagnetic field formed by the tag transmission unit 112 is stronger than that in the radiated near-field that satisfies $L1 > \lambda/2\pi$. The contribution of quasi-static and induced electromagnetic fields remaining in the vicinity of the line 102a is relatively large while the contribution of a radiated electromagnetic field is small. In the article management system 1 according to the first exemplary embodiment, the coupling between the article to be managed 105 and the tag transmission unit 112 is strong. As a result, the operating characteristics of the tag transmission unit 112 are greatly influenced by the presence or absence of an article to be managed 105. Thus, the article management system 1 according to the first exemplary embodiment causes a considerable variation in reflected electromagnetic field transmitted from the RF tag 104 to the RFID reader 103. This achieves an article management system robust against disturbance and noise, which can suppress erroneous detection.

In the article management system 1 according to the first exemplary embodiment, the line-of-sight distance L2 satisfies a relation $L2 \leq \lambda/2\pi$. In this manner, since the line-of-sight distance L2 satisfies a relation $L2 \leq \lambda/2\pi$, the article management system 1 according to the first exemplary embodiment allows quasi-static and induced electromagnetic fields remaining in the vicinity of the line 102a to make a relatively large contribution and allows strong coupling between the line 102a and the tag transmission unit 112, compared to the case where the line-of-sight distance L2 satisfies $L2 > \lambda/2\pi$. In the article management system 1 according to the first exemplary embodiment, radio communication between the RFID reader 103 and the RF tag 104 is also less subject to disturbance and noise. Accordingly, the article management system 1 according to the first exemplary embodiment can be less subject to disturbance and noise. Because components of quasi-static, induced, and radiated electromagnetic fields are mixed with each other at a sufficient strength and the vector experiences various temporal variations in direction. Hence, the article management system 1 according to the first exemplary embodiment can attain a high degree of freedom of relative position between the line 102a and the tag transmission unit 112.

In the article management system 1 according to the first exemplary embodiment, upon satisfaction of a relation $L2 \leq \lambda/2\pi$, the line-of-sight distance between the line 102a and the RF tag 104 is about 0.05 m or less in the UHF band that is one of the RFID standard frequencies and about 0.02 m or less in the 2.4-GHz band. The article management system 1 according to the first exemplary embodiment requires no wide space between the line 102a and the RF tag 104. For example, a line 102a, RF tags 104, and articles to be managed can be stored on commodity shelves. Setting a narrower interval makes it possible to inhibit entrance of a person or an object to suppress erroneous detection due to the interruption of the line-of-sight vision.

As is generally well known, when commodities on commodity shelves are managed by attaching RF tags to the commodities, the positions where RF tags are attached vary depending on the type of commodity to which the tags are attached. For this reason, satisfying the above-mentioned relation $L2 \leq \lambda/2\pi$ unpreferably limits the type of commodity and the positions where RF tags are attached. When articles to be managed are managed by attaching RF tags to the articles, a structure that uses a radiated electromagnetic field capable of radio communication that covers the far-field needs to be used to allow radio communication between the line and the RF tag even if they are slightly separate from each other. In this case, therefore, an open-type transfer line basically intended to suppress radiation and transfer electromagnetic waves in the longitudinal direction of the line is inapplicable, and a commonly-used resonant antenna structure or a leakage coaxial cable is used. However, when such a line that generates a radiated electromagnetic field with high efficiency is used, the radiated electromagnetic field attenuates only by $1/\gamma$ of the distance so the reading area extends. This poses problems in terms of commodity management, such as reading RF tags attached to commodities on other adjacent shelves together.

However, with the article management system 1 according to the first exemplary embodiment, no RF tags 104 are attached to commodities. It is, therefore, easy to lay a line 102a on, for example, the bottom surfaces of commodity shelves, adjust the coupling coefficients, place RF tags 104 on the line 102a to satisfy a relation $L2 \leq \lambda/2\pi$, and further place commodities to be managed on the RF tags 104. Hence, the article management system 1 according to the first exemplary embodiment can use an open-type transfer line basically intended to suppress radiation and transfer electromagnetic waves in the longitudinal direction of the line. The system thus uses a line 102a which suppresses radiation that attenuates only by $1/\gamma$ and uses a quasi-static electromagnetic field that attenuates by $1/\gamma^3$ and an induced electromagnetic field that attenuates by $1/\gamma^2$ as main electromagnetic field components. This makes it easy to limit the region where commodities are managed by reading the RF tags 104 using only one line 102a in managing the presence or absence of the commodities on commodity shelves. Thus, RF tags 104 on other adjacent shelves are less likely to be read. Although commodity management on the commodity shelves has been taken as an example herein, it is similarly easy to limit the region where the RF tags 104 are read using only one line 102a and, in turn, to limit the region for article management even if articles placed on other shelves or the floor are managed, as a matter of course.

In the article management system 1 according to the first exemplary embodiment, the first distance L1 and the second distance L2 satisfy a relation L2>L1. The strength of electromagnetic coupling varies not only depending on the structures of a line and a resonator and the property of the medium between the line and the RFID tag but also greatly depending on the distance. With the article management system 1 according to the first exemplary embodiment, setting L2>L1 allows the coupling coefficient k2 between the tag transmission unit 112 and the distribution area in which articles to be managed are placed 110 to place the article to be managed 105 to be larger than the coupling coefficient k1 between the line 102a and the tag transmission unit 112. In other words, ensuring a relation L2>L1 causes a greater variation in reflected wave strength in response to a variation in frequency characteristic of the tag transmission unit 112 that depends on the presence or absence of an article, than maintaining radio communication between the tag transmission unit 112 and the line 102a. More specifically, the article management system 1 according to the first exemplary embodiment can reliably determine the presence or absence of an article to be managed 105 and therefore suppress erroneous detection.

In the article management system 1 according to the first exemplary embodiment, the coupling coefficient k1 between the line 102a and the tag transmission unit 112 is set to $10^{-5}$ or more. The power reception sensitivity that defines the operation limit of the current UHF-band RF tag is nearly −20 dBm. The output of a high output, UHF-band RFID reader is 30 dBm. Accordingly, when the coupling coefficient k1 is $10^{-5}$ or more, power that operates a UHF-band RF tag can be supplied.

In the article management system 1 according to the first exemplary embodiment, the coupling coefficient k1 between the line 102a and the tag transmission unit 112 is set to $10^{-2}$ or less. Assume that the tag transmission unit 112 serves as a dipole resonator. Then, when the line 102a (for example, an open-type transfer line) and the tag transmission unit 112 are electromagnetically coupled to each other, the open-type transfer line and the resonator can be said to be coupled to each other in the circuit. When the coupling coefficient is too high, the coupling considerably influences the operation of the open-type transfer line and, in turn, influences the operations of other RF tags 104 as a coupled resonator system. When a plurality of resonators are coupled to the open-type transfer line in parallel, the circuit of a band-elimination filter is assumed. In this case, when the tag transmission unit of a UHF-band RF tag uses copper or aluminum at room temperature, the no-load Q value is approximately 100 or less. Upon setting of the coupling coefficient k1 that determines the relative band to $10^{-2}$ or less, the coupling has little influence on the operation of the open-type transfer line. Accordingly, setting the coupling coefficient k1 to $10^{-2}$ or less makes it possible to suppress the influence that the coupling of the tag transmission unit 112 exerts on the open-type transfer line and, in turn, to suppress the influence that the open-type transfer line and the RFID reader 103 parallelly coupled to the open-type transfer line exert on each other.

In the article management system 1 according to the first exemplary embodiment, the coupling coefficient k1 between the line 102a and the tag transmission unit 112, and the coupling coefficient k2 between the article to be managed 105 and the tag transmission unit 112 when the article to be managed 105 is located in the distribution area in which articles to be managed are placed 110 satisfy a relation k1<k2. According to the present invention, setting k1<k2, that is, setting the coupling coefficient k2 between the distribution area in which articles to be managed are placed 110 and the tag transmission unit 112 larger than the coupling coefficient k1 between the line 102a and the tag transmission unit 112 causes a greater variation in reflected wave strength in response to a variation in frequency characteristic of the tag transmission unit 112 that depends on the presence or absence of an article, than maintaining radio communication between the line 102a and the tag transmission unit 112. In other words, the article management system 1 according to the first exemplary embodiment can reliably determine the presence or absence of an article to be managed 105 and therefore suppress erroneous detection.

In the above-described first exemplary embodiment, the positional relationships among the line 102a, the RF tag 104, and the article to be managed 105 have been specifically described. However, the relative positions and orientations of these components are not limited to a specific example shown in FIG. 2.

The meaning of non-contact signal communication using a coupler including a signal communication unit and an antenna in the article management system 1 will be described below. A sheet unit 201 is required to appropriately support the RF tag 104 in accordance with, for example, the size and shape of the article to be managed 105. The required area of the sheet unit 201 also varies depending on the number of articles to be managed 105 to be detected. In contrast to this, even if the placement of the RF tag 104 or the size of the sheet unit 201 is different, the operation of the RFID reader 103 that sends a transmission signal and receives a response signal stays the same. In other words, the configuration and function of the RFID reader 103 are not related to a change in configuration of the sheet unit 201 in essence.

In the article management system 1 according to the present exemplary embodiment, a signal communication unit and an antenna are used to communicate transmission and response signals in a non-contact manner. In other words, the sheet unit 201 and a reader unit 202 can be physically separated from each other. When the reader unit 202 includes a signal communication unit, it can exchange transmission and response signals with a sheet unit different from the sheet unit 201, by non-contact communication. In other words, the replacement of the sheet unit is possible in the article management system 1. With this configuration, a variety of sheet units can be used without changing the reader unit 202, in accordance with how the sheet unit will be used.

Figure 13:
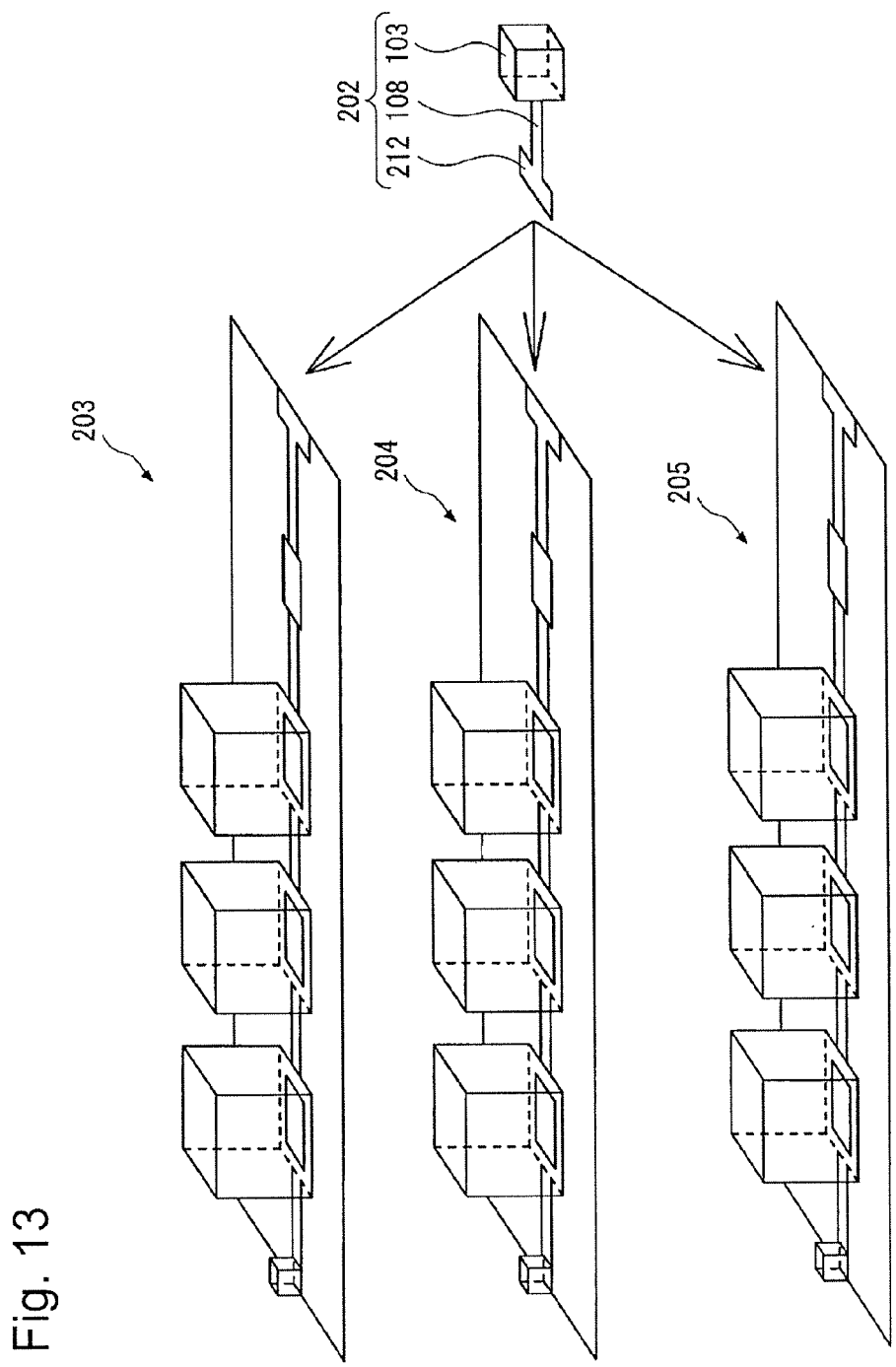
FIG. 13 is a view illustrating how a reader unit 202 is adapted to a plurality of sheet units in the article management system 1.

FIG. 13 is a view illustrating how the reader unit 202 is adapted to a plurality of sheet units in the article management system 1. Referring to FIG. 13, a signal communication unit of any of sheet units 203 to 205 is placed not in contact with, but in proximity to an antenna 212 to couple it to the corresponding one of the sheet units 203 to 205 via a coupling unit to allow communication of transmission and response signals. Each of the sheet units 203 to 205 corresponds to the sheet unit 201. In this example, the sheet units 203 to 205 have different sizes. When sheet units that are not coupled to the reader unit 202 are stored, the sheet coupled to the reader unit 202 can be easily replaced with any of them upon a change in how the sheet unit will be used.

An example in which in the article management system 1, the line 102a is directly connected to the wiring 108 led from the RFID reader 103 instead of using a signal communication unit and an antenna will be considered herein. In this case, since the line 102a and the wiring 108 led from the RFID reader 103 are physically integrated with each other, an RFID reader 103 needs to be provided for each individual sheet unit. This increases the cost incurred in the article management system.

A configuration that connects the line 102a to the wiring 108 led from the RFID reader 103 via a connector is also possible. However, the connector requires contact and fixation of a plug and a socket. Therefore, upon repetitions of replacement of sheet units, the contact between the plug and the socket wears, which may result in contact failure. Further, when a generally standardized connector is used, the connector projects from the sheet unit. In this case, the accommodation performance of a sheet unit degrades so that the position where the sheet unit may be limited. The cost of components of the connector leads to the high cost of the article management system.

Under the circumstances, in the article management system 1 according to the present exemplary embodiment, a signal communication unit and an antenna are coupled to each other in a non-contact manner by electromagnetic coupling. Since the contact does not wear even after repetitions of replacement of sheet units, contact failure can be prevented. As described above with reference to FIGS. 6 to 11, a signal communication unit and an antenna can be implemented in a simple, compact configuration fitted on the plane using a line. The signal communication unit does not project from the sheet unit, the accommodation performance of the sheet unit is high, and the position where the sheet unit is placed is not limited. A signal communication unit and an antenna can be manufactured at low cost using a line, and this is advantageous in terms of reducing the manufacturing cost of the article management system 1.

Second Exemplary Embodiment

Figure 14:
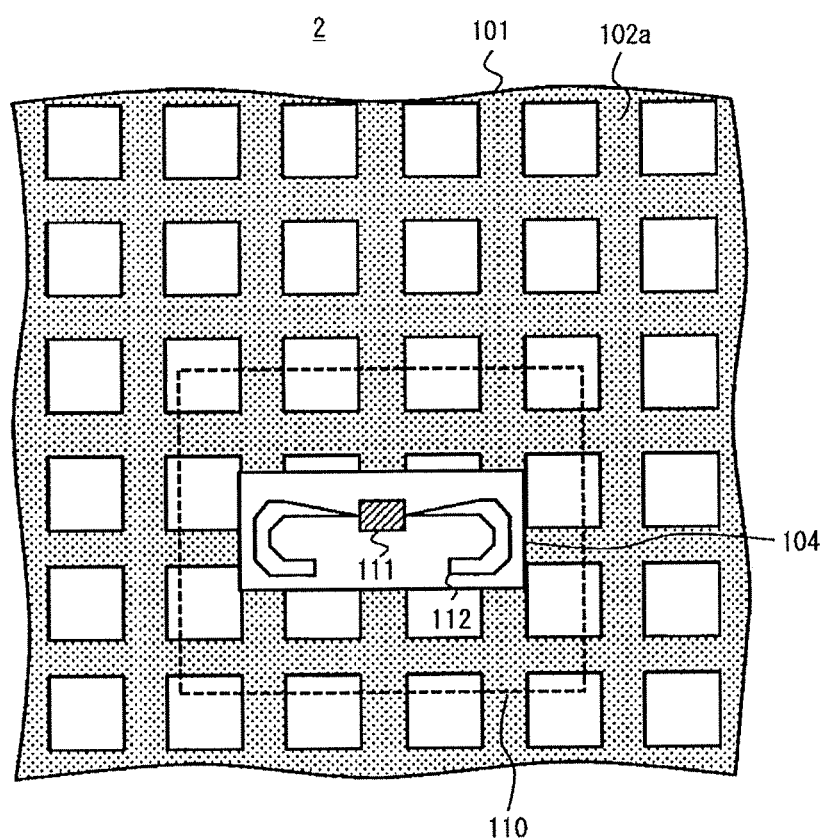
FIG. 14 is a top view of an article management system 2 according to a second exemplary embodiment.
Figure 15:
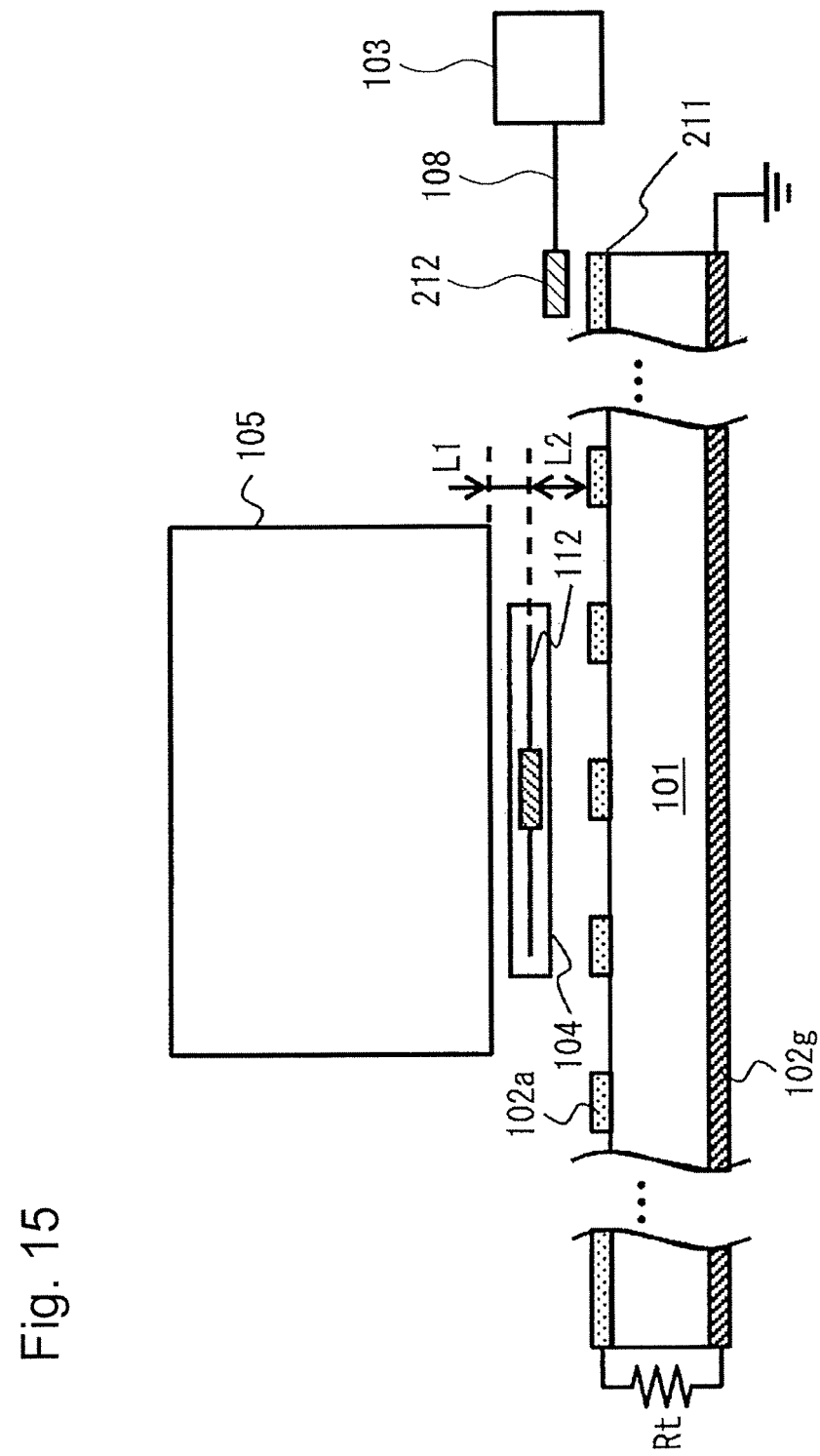
FIG. 15 is a front view of the article management system 2 according to the second exemplary embodiment.
Figure 16:
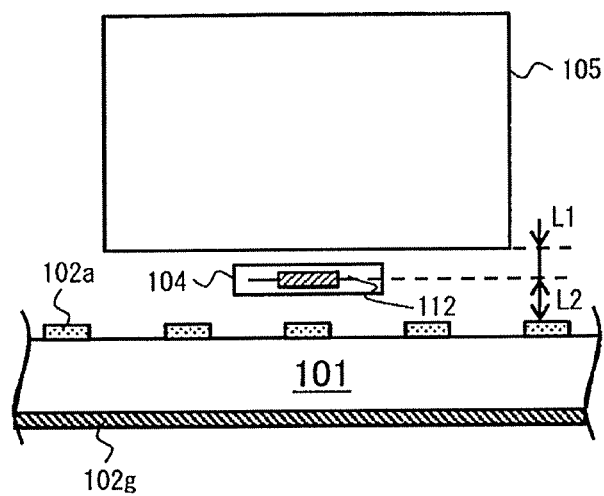
FIG. 16 is a side view of the article management system 2 according to the second exemplary embodiment.

In a second exemplary embodiment, a line extending in a plane is used as a line 102a. FIG. 14 is a top view of an article management system 2 according to the second exemplary embodiment, FIG. 15 is a front view of the article management system 2 according to the second exemplary embodiment, and FIG. 16 is a side view of the article management system 2 according to the second exemplary embodiment. The same reference numerals as in the first exemplary embodiment denote the same components in the second exemplary embodiment, and a description thereof will not be given.

In the article management system 2 according to the second exemplary embodiment, the line 102a is formed to change the electromagnetic field and communicate signals in a gap region interposed between meshed and sheet-like conducting portions and in a leakage region on the exterior of the meshed conducting portion. In the article management system 2 according to the second exemplary embodiment, the line 102a is placed in a mesh shape on the front surface of an article management plate 101, as illustrated in FIG. 14. Further, in the article management system 2 according to the second exemplary embodiment, a grounding conductor 102ag is formed on the back surface of the article management plate 101.

In the article management system 2 according to the second exemplary embodiment, meshed conductors that constitute the line 102a when viewed from the front and the side are spaced apart from each other, as illustrated in FIGS. 15 and 16. As can be seen from FIGS. 15 and 16, in the second exemplary embodiment, the line 102a is placed in a mesh shape. As can also be seen from FIGS. 15 and 16, in the second exemplary embodiment, the grounding conductor 102ag is formed on the back surface of the article management plate 101 in a sheet shape.

In the line 102a for the article management system 2 according to the second exemplary embodiment, a standing wave occurs within the line due to failure of edge portion processing, but traveling-wave components also exist albeit incompletely. The line 102a can be used as long as unevenness of the electromagnetic field distribution caused by the standing wave is negligible.

Third Exemplary Embodiment

Figure 17:
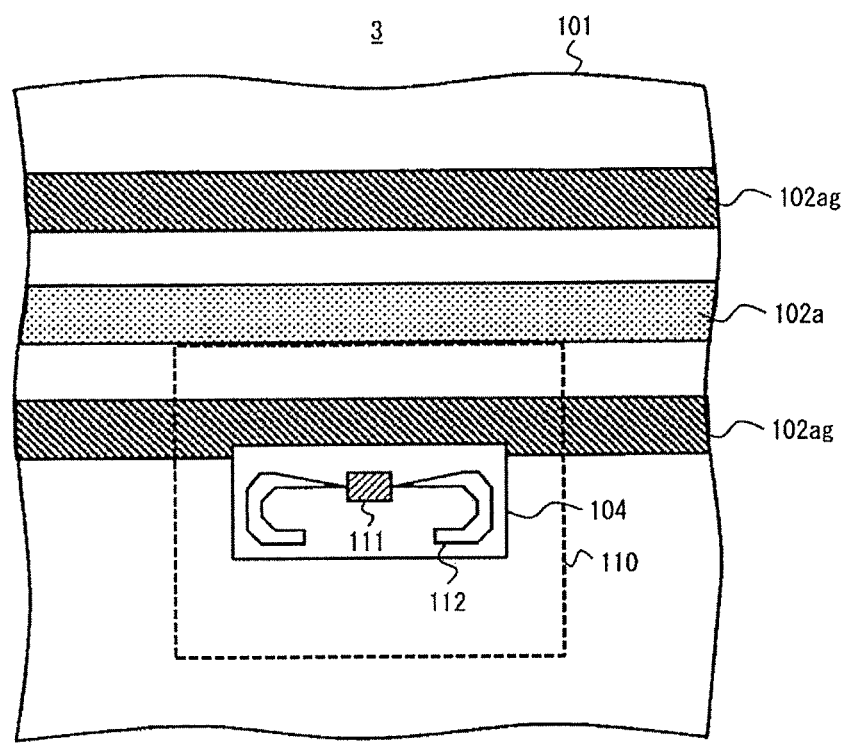
FIG. 17 is a top view of an article management system 3 according to a third exemplary embodiment.
Figure 18:
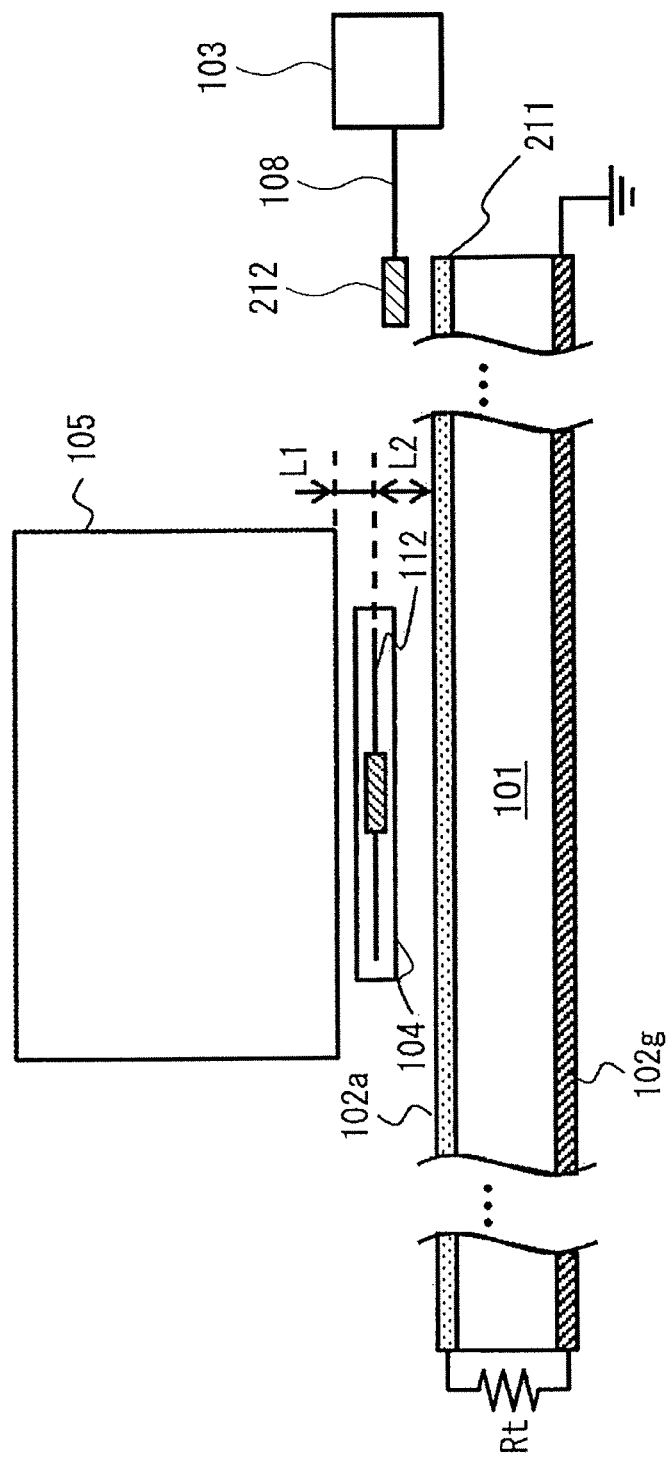
FIG. 18 is a front view of the article management system 3 according to the third exemplary embodiment.
Figure 19:
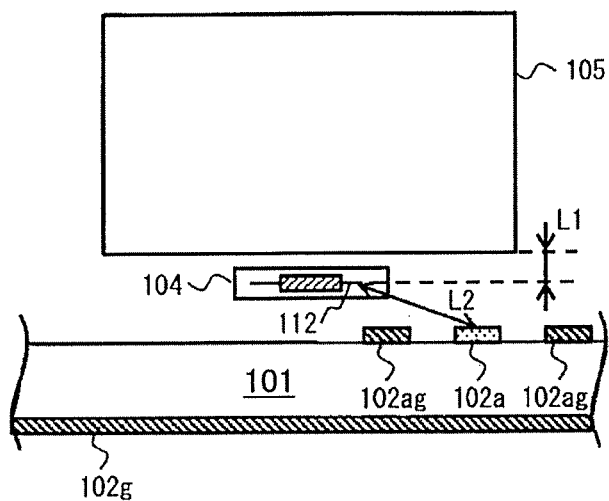
FIG. 19 is a side view of the article management system 3 according to the third exemplary embodiment.

An article management system 3 according to a third exemplary embodiment employs a traveling-wave antenna structure that uses an open-type transfer line implemented in a grounded coplanar line as a line 102a. FIG. 17 is a top view of the article management system 3 according to the third exemplary embodiment, FIG. 18 is a front view of the article management system 3 according to the third exemplary embodiment, and FIG. 19 is a side view of the article management system 3 according to the third exemplary embodiment. The same reference numerals as in the first exemplary embodiment denote the same components in the third exemplary embodiment, and a description thereof will not be given.

In the article management system 3 according to the third exemplary embodiment, the line 102a and two grounding conductors 102ag are formed on the front surface of an article management plate 101 with the line 102a interposed between these conductors, as illustrated in FIG. 17. In the article management system 3 according to the third exemplary embodiment, a grounding conductor 102g is formed on the back surface of the article management plate 101 in a sheet shape, as illustrated in FIGS. 18 and 19.

Compared to the case where a microstrip line is used in the first exemplary embodiment, a coplanar line enables easier induction of an electric field distribution on its surface and accordingly allows easier electromagnetic coupling between the line 102a and a tag transmission unit 112. A line-of-sight distance L2 from the line 102a to the tag transmission unit 112 is defined as the distance from the line 102a to the tag transmission unit 112 in a region that is visible across the grounding conductors 102ag, as illustrated in, for example, the side view of FIG. 18. Although an RF tag 104 and the line 102a are placed below an article to be managed 105, the article management system 3 according to the third exemplary embodiment operates even after, for example, rotation through 90° that turns the lower surface into a side wall surface. The article management system 3 naturally operates even after rotation through 180° that turns the lower surface into an upper surface. In other words, FIGS. 17 to 19 illustrated in the third exemplary embodiment merely show exemplary relative positional relationships among the article to be managed 105, the RF tag 104, and the line 102a.

Fourth Exemplary Embodiment

Figure 20:
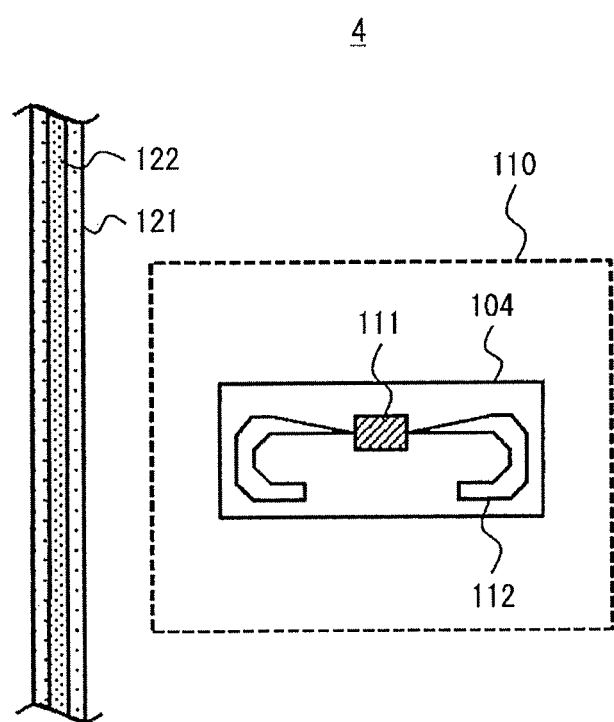
FIG. 20 is a top view of an article management system 4 according to a fourth exemplary embodiment.
Figure 21:
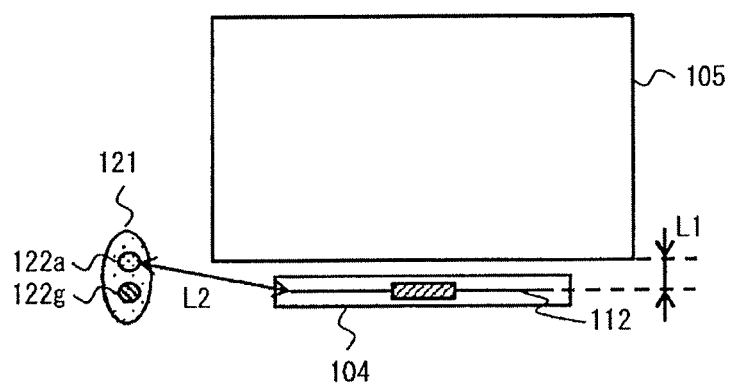
FIG. 21 is a front view of the article management system 4 according to the fourth exemplary embodiment.
Figure 22:
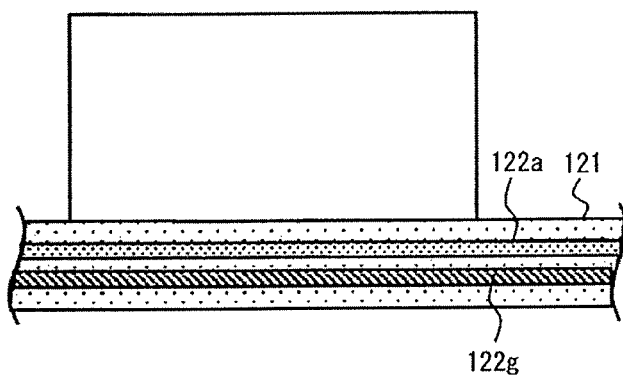
FIG. 22 is a side view of the article management system 4 according to the fourth exemplary embodiment.

An article management system 4 according to a fourth exemplary embodiment employs a balanced two-wire transfer line as a line 102a. In the fourth exemplary embodiment, a feeder line constituted by two copper wires and serving as a balanced two-wire transfer line is used as an open-type transfer line, which is used as a traveling-wave antenna structure. FIG. 20 is a top view of the article management system 4 according to the fourth exemplary embodiment, FIG. 21 is a front view of the article management system 4 according to the fourth exemplary embodiment, and FIG. 22 is a side view of the article management system 4 according to the fourth exemplary embodiment. The same reference numerals as in the first exemplary embodiment denote the same components in the fourth exemplary embodiment, and a description thereof will not be given.

In the article management system 4 according to the fourth exemplary embodiment, a feeder line 121 is placed on the lateral side of an article to be managed 105 and an RF tag 104, as illustrated in FIG. 20. In the article management system 4 according to the fourth exemplary embodiment, the RF tag 104 is placed below the article to be managed 105, as illustrated in FIGS. 21 and 22. The feeder line 121 accommodates two copper wires 122.

In the article management system 4 according to the fourth exemplary embodiment, the orientation of the RF tag 104 and the position of the RF tag 104 relative to the feeder line 121 can be very freely set, as illustrated in FIGS. 20 to 22.

Although the fourth exemplary embodiment shows an example in which one article to be managed 105, one RF tag 104, and one feeder line 121 are used, the numbers of articles to be managed 105, RF tags 104, and feeder lines 121 are not limited to the example illustrated in FIGS. 20 to 22. It is naturally possible to detect the article to be managed 105 using a plurality of RF tags 104, and even to read a plurality of RF tags 104 using only one feeder line 121. Since the feeder line 121 used as a line basically serves as a transfer line, a plurality of feeder lines 121 can be connected in series or parallel as long as impedance matching is ensured. It is also possible to detect n articles using m RF tags 104.

Fifth Exemplary Embodiment

Figure 23:
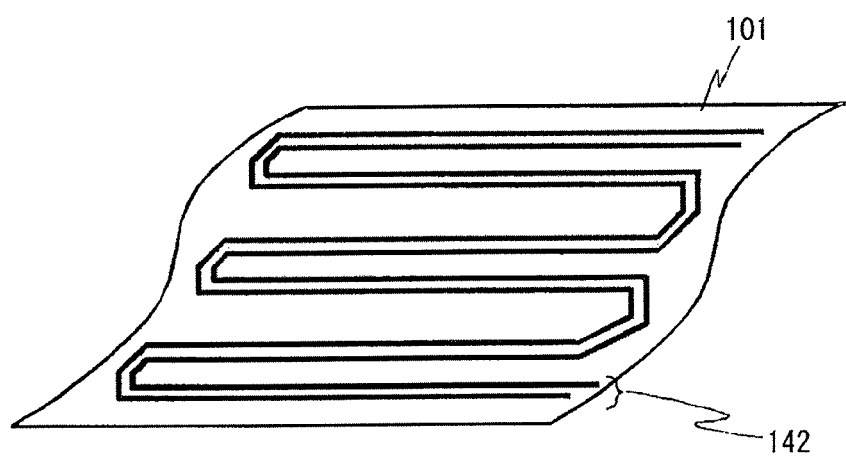
FIG. 23 is a schematic view illustrating an article management plate 101 provided with a meandered coplanar slot line 142.

In a fifth exemplary embodiment, a meandered coplanar slot line 142 that is one type of rectilinear open-type transfer line is employed as one of open-type transfer lines. FIG. 23 is a schematic view illustrating an article management plate 101 provided with the meandered coplanar slot line 142.

The coplanar slot line 142 is formed on the front surface of the article management plate 101 at a predetermined turning period, as illustrated in FIG. 23. In this case, however, it is undesired to positively emit radiation by the line, unlike the crank-line antenna structure and meander-line antenna structure described earlier. This is because upon radiation, as the radiation loss gets higher, the characteristic impedance of the line more greatly varies in the portion of interest, thus generating a standing wave. It is, therefore, undesired to reduce the coverage area or generate a dead region of an RF tag due to the limitation of extension of the line. It is desired to take measures such as the use of a shield in part when strong radiation occurs depending on, for example, the turning period.

Sixth Exemplary Embodiment

Figure 24:
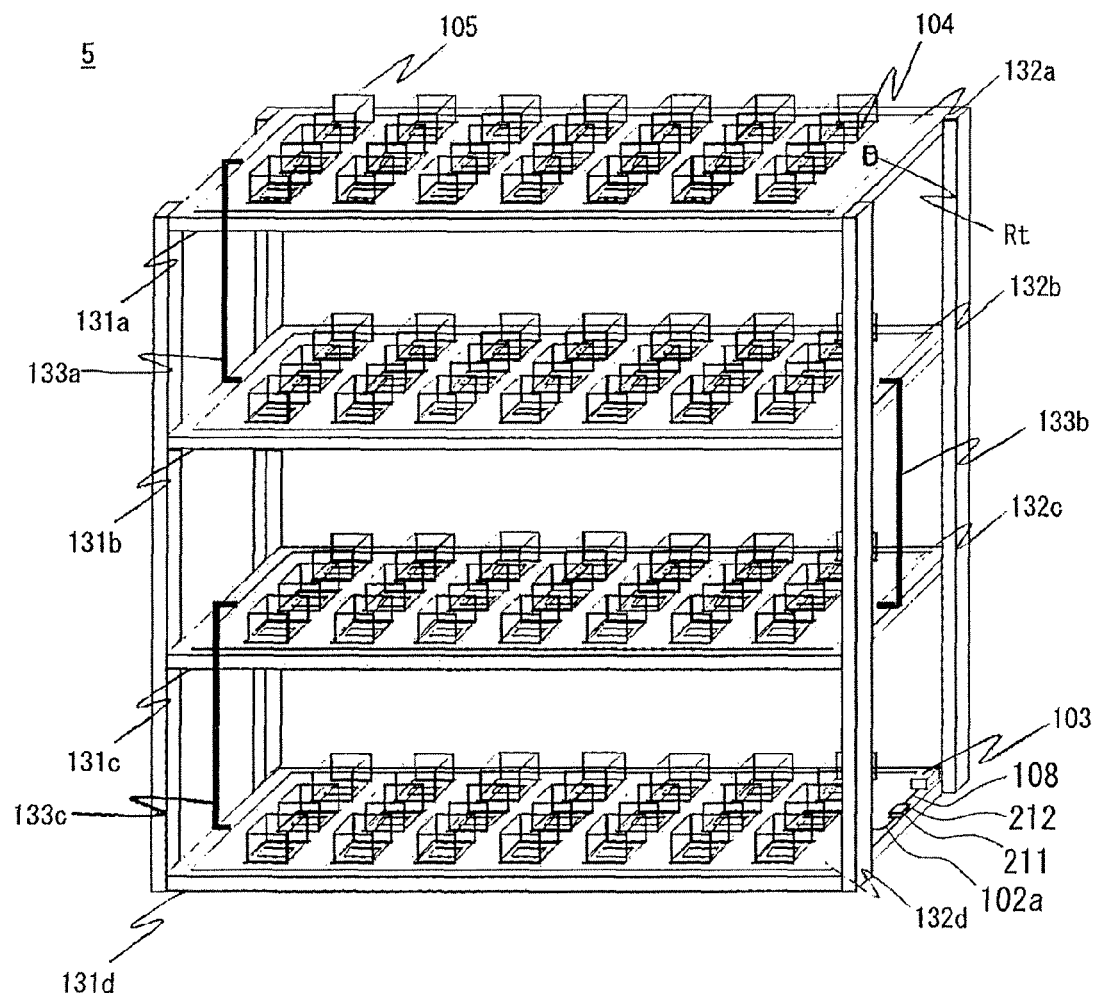
FIG. 24 is a view schematically illustrating an article management system 5 according to a sixth exemplary embodiment.

In a sixth exemplary embodiment, lines and RF tags are placed on a plurality of shelves, and a plurality of RF tags placed on the plurality of shelves are managed by a single RFID reader. FIG. 24 is a view schematically illustrating an article management system 5 according to the sixth exemplary embodiment. The same reference numerals as in the first exemplary embodiment denote the same components in the sixth exemplary embodiment, and a description thereof will not be given.

In the sixth exemplary embodiment, articles to be managed 105 are lined up on shelves constituted by shelf plates 131a to 131d in four stages, as illustrated in FIG. 24. Sheet-like lines 132a to 132d connected in series to an RFID reader 103 using cables 133a to 133c are placed on the front surfaces of the shelf plates 131a to 131d, respectively. A matching terminating resistor Rt is attached to the right end of the line 132a among the lines 132a to 132d.

When a plurality of lines are attached to the RFID reader 103, they may be connected in series, as illustrated in FIG. 24, be connected in parallel using a distributor, or be connected by a combination of series and parallel connection. With series connection, an open-type transfer line having a traveling-wave antenna structure used can serve as part of a cable, thus shortening the entire cable length. In addition, since a distributor or the like is not used, signals are prevented from being attenuated too much.

Parallel connection can prevent nonuniform tag reading due to repetitions of attenuation in the line or the cable. It is possible to, for example, combat the situation in which a rightmost RF tag 104 on the line 132d can easily be read while a rightmost RF tag 104 on the line 132a can hardly be read because of considerable attenuation of a signal from the RFID reader 103 and a reflected signal generated by the RF tag 104. Further, in parallel connection, instead of a distributor, a switch that performs switching between the lines is turned on for control from the RFID reader 103, thereby allowing the selective use of the plurality of lines 132d to 132a by time division. At this time, the output of the RFID reader 103 can be sufficiently weakened by setting the interval between the RF tag 104 and the line small to reinforce the coupling. Alternatively, the radiated electric field from the line can be set weak. This can set a small distance across which the line perceives the RF tag 104. In other words, none of the line 132d and the lines 132a and 132c adjacent to the line 132b reads the RF tag 104 on the line 132b. When the shelf plates operate independently of each other in this way, the use of a plurality of lines by time division can increase the number of manageable RF tags 104 to a multiple of the number of lines.

Although the sixth exemplary embodiment shows an example in which one line is placed on one shelf plate, the exemplary embodiment of the present invention is not limited to this. For example, a plurality of lines may be placed on one shelf plate. Portions connected to each other via a cable may be used as a continuous line, instead of a cable, by exploiting the open-type transfer line property of the line. In other words, one line may be placed on a plurality of shelf plates.

The operation of the article management system 5 according to the sixth exemplary embodiment will be described herein. In the article management system 5, each of the RF tags 104 placed on the lines 132a to 132d illustrated in FIG. 24 has unique tag information. The tag information of the RF tags 104 is recorded in advance. At this time, when one wants to know the position of the article to be managed 105, the position on the shelf is preferably recorded in association with the tag information. The RFID reader 103 sends a signal to inquire of the lines 132a to 132d about tag information. Then, as for the position where no article to be managed 105 is present, each RF tag 104 sends back its tag information. On the other hand, if an article to be managed 105 is present, the RF tag 104 makes no response or its reflected signal intensity is lower than that in the absence of an article to be managed 105, as has also been described in the first exemplary embodiment. The article management system 5 also determines the presence or absence of an article to be managed 105, based on the signal intensity. In doing this, the position associated with the tag information is collated with the information indicating the presence or absence of an article to be managed 105 so that the position where an article to be managed 105 is present or absent can be detected.

The sixth exemplary embodiment shows a particular example in which RF tags 104 are laid on the bottom surfaces of shelf plates, the present invention is not limited to this. For example, RF tags 104 may be placed on the wall surfaces of shelves when articles, such as books or confections including chocolates packed in aluminum foil packages, are stacked flat. In this case, the placement of the line is changed accordingly. RF tags 104 may also be placed on the shelf top plate. For example, a refrigeration case at a convenience store often uses a shelf plate equipped with rollers that, as the customer takes a drink out of it, automatically pushes out the next drink to the front. In such a case, RF tags 104 may be arrayed on the shelf top plate and drinks lined up on the lower side may be detected.

Examples of articles to be managed 105, the presence or absence of which is detectable, include objects containing metal materials, such as snack foods, cigarettes, chocolates, and gums packed in aluminum foil packages. Objects containing moisture that is a high-permittivity material are also detectable and include drinks, rice balls, bread, prepared foods, and packed lunches. An experiment reveals that bundles of thick paper sheets such as books are moreover detectable. Since the human body is detectable as well, embedding the present system within the floor, for example, allows detection of the flow of human walking. Information indicating whether, for example, any person has fallen down, is sitting, or is standing in the rest room can be detected without violation of his or her privacy. Or again, when the present system is attached to a wall surface, human contact can be detected. A movable touch button can be implemented by moving the RF tag 104 on the line.

The present invention is not limited to the above-described exemplary embodiments and can be changed as appropriate without departing from the spirit. For example, although article management for shelves has been particularly described in the present exemplary embodiments, the range of application of an article management system according to the present invention is not limited to shelves. An article management system according to the present invention can be placed on, for example, a pallet or floor to manage articles to be mounted on the pallet or floor, as a matter of course.

Although the present invention assumes an RF tag 104 equipped with a semiconductor chip, a chipless RF tag that is under development in recent years is also applicable. The chipless RF tag includes, for example, an internal resonator having a plurality of different resonant frequencies. An ID number represented by several bits can be read by radio by detecting a combination of these resonant frequencies using a reader. In such a chipless RF tag as well, since the ID is readable if no article to be managed 105 is located while the ID is unreadable if an article is present, the present invention is applicable.

As described above, the present invention can provide an article management system. In the system, no RF tag is attached to an article to be managed. The placement of the article to be managed is not limited to the position between the reader and the tag. The system requires no wide space between the RFID reader and the RF tag. The system suppresses multipath phenomena and erroneous detection due to entrance of a person or an object to the space between the line and the position where any article is placed.

The present invention has been described above with reference to exemplary embodiments but is not limited to the above-described exemplary embodiments. Various changes which can be understood by those skilled in the art can be made to the configurations and details of the present invention within the scope of the present invention.

This application claims priority based on Japanese Patent Application No. 2013-233130 filed on Nov. 11, 2013, the disclosure of which is incorporated herein by reference in its entirety.

REFERENCE SIGNS LIST

1-5 article management system
101 article management plate
102*a* line
102*ag* grounding conductor
102*g* grounding conductor
103 RFID reader
104 RF tag
105 article to be managed
106 shielding plate
107 fixing plate
108 wiring
109 screw hole
110 distribution area in which articles to be managed are placed
111 RFID chip
112 tag transmission unit
121 feeder line
122 copper wire
131*a*-131*d* shelf plate
132*a*-132*d* line
133*a*-133*d* cable
142 coplanar slot line
150 screw
151 spacer
201, 203-205 sheet unit
202 reader unit
211, 213, 215 signal communication unit
212, 214, 216 antenna
213*a*, 214*a* open portion

The invention claimed is:

1. An article management system comprising:
   a line constituted by an open-type transfer line terminated with matching termination, the line transmitting and receiving a radio signal;
   a distribution area in which an article to be managed is placed, the article to be managed being placed in the distribution area;
   an RF tag provided with tag transmission unit for electromagnetic coupling with the line of the distribution area for the article to be managed;
   signal communication unit provided to one end of the line;
   an antenna configured to perform non-contact signal communication with the signal communication unit; and
   an RFID reader for sending out a transmission signal to the antenna, and receiving a response signal output by the tag transmission unit via the antenna, wherein the RFID reader detects one of presence and absence of the article to be managed by detecting a variation in an operating characteristic of the tag transmission unit caused by the article to be managed as a result of a variation in one of an intensity and a phase of a signal reflected from the RF tag.

2. The article management system according to claim 1, wherein letting λ be a wavelength of a signal used for radio communication by the RFID reader and the RF tag, and L1 be a first distance between the article to be managed and the tag transmission unit, the distribution area for the article to be managed is set at a position that satisfies a relation $L1 \leq \lambda$, and letting L2 be a second distance representing a line-of-sight distance between the line and the tag transmission unit, the RF tag is set at a position that satisfies a relation $L2 \leq \lambda$.

3. The article management system according to claim 2, wherein the first distance satisfies a relation $L1 > \lambda/2\pi$, where π is a ratio of a circumference of a circle to a diameter thereof.

4. The article management system according to claim 2, wherein the second distance satisfies a relation $L2 > \lambda/2\pi$, where π is a ratio of a circumference of a circle to a diameter thereof.

5. The article management system according to claim 2, wherein the first distance and the second distance satisfy a relation $L2 > L1$.

6. The article management system according to claim 1, wherein a coupling coefficient k1 between the line and the tag transmission unit satisfies $10^{-5} \leq k1 \leq 10^{-2}$.

7. The article management system according to claim 1, wherein a coupling coefficient k1 between the line and the tag transmission unit is smaller than a coupling coefficient k2 between the article to be managed and the tag transmission unit.

8. The article management system according to claim 1, further comprising an article management plate, wherein a grounding wire is placed on a back surface of the article management plate and connected to the line via a matching terminating resistor, the line is placed on a front surface of the article management plate in a mesh shape, the RF tag is placed at a position above the line, and the distribution area for the article to be managed is set at a position above the RF tag.

9. The article management system according to claim 1, further comprising an article management plate, wherein a grounding wire is placed on a back surface of the article management plate and connected to the line via a matching terminating resistor, the line and the grounding wire are alternately placed on a front surface of the article management plate with a spacing between the line and the grounding wire, the RF tag is placed at a position above the line, and the distribution area for the article to be managed is set at a position above the RF tag.

10. The article management system according to claim 1, further comprising an article management plate, wherein the line is placed on a lateral side of the RF tag, the RF tag is placed on a front surface of the article management plate, and the distribution area for the article to be managed is set at a position above the RF tag.

11. The article management system according to claim 1, wherein the antenna is opposed to the signal communication unit.

12. The article management system according to claim 1, wherein the antenna is set on a plane identical to a plane on which the signal communication unit is set.

13. The article management system according to claim 11, wherein the antenna and the signal communication unit are formed by a rectilinear line, and the antenna and the signal communication unit form a parallel-coupling transfer line coupler.

14. The article management system according to claim 11, wherein the antenna and the signal communication unit are formed by an open ring-shaped line, and the antenna and the signal communication unit form an open ring coupler.

15. The article management system according to claim 11, wherein the antenna and the signal communication unit are formed by a spiral coil-shaped line, and the antenna and the signal communication unit form a spiral coil coupler.

16. The article management system according to claim 1, further comprising shielding unit for electromagnetically shielding the antenna and the signal communication unit.

* * * * *